(12) United States Patent
Bjordammen et al.

(10) Patent No.: US 9,503,765 B2
(45) Date of Patent: *Nov. 22, 2016

(54) AVERTING AD SKIPPING IN ADAPTIVE BIT RATE SYSTEMS

(71) Applicant: ARRIS Enterprises, Inc., Suwanee, GA (US)

(72) Inventors: David M. Bjordammen, Blue Bell, PA (US); Niranjan R. Samant, Lansdale, PA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/808,188

(22) Filed: Jul. 24, 2015

(65) Prior Publication Data
US 2015/0334431 A1 Nov. 19, 2015

Related U.S. Application Data

(63) Continuation of application No. 14/017,455, filed on Sep. 4, 2013, now Pat. No. 9,124,947.

(51) Int. Cl.
*H04N 7/173* (2011.01)
*H04N 21/238* (2011.01)
(Continued)

(52) U.S. Cl.
CPC ........ *H04N 21/23805* (2013.01); *G06Q 30/02* (2013.01); *G06Q 30/0253* (2013.01); *G06Q 30/0262* (2013.01); *H04L 65/4084* (2013.01); *H04L 65/607* (2013.01); *H04N 21/2387* (2013.01); *H04N 21/23418* (2013.01); *H04N 21/23424* (2013.01); *H04N 21/2625* (2013.01);
(Continued)

(58) Field of Classification Search
CPC ................. H04N 21/2343; H04N 21/234309; H04N 21/24; H04N 21/234; H04N 21/23424; H04N 21/2625; H04N 21/26258
USPC .................................. 725/87, 88, 90, 93, 96
See application file for complete search history.

(56) References Cited

U.S. PATENT DOCUMENTS 9,124,947 B2 * 9/2015 Bjordammen ... H04N 21/23424
9,137,278 B2 * 9/2015 Strasman ................ H04L 29/06
(Continued)

FOREIGN PATENT DOCUMENTS

WO 2013173554 A1 11/2013

OTHER PUBLICATIONS

"White Paper: Adaptive Streaming Ad Insertion: Modifying Playlists to Deliver Targeted Ads Using HTTP Adaptive Streaming", Jan. 1, 2011, retrieved from the Internet at URL <http://www.rbgnetworks.com/pdfs/Adaptive_Bitrate_Ad_Insertion_White_Paper_0911-01.pdf> on Jan. 9, 2014, 8 pgs.
(Continued)

*Primary Examiner* — James R Sheleheda
(74) *Attorney, Agent, or Firm* — Lori Anne D. Swanson

(57) ABSTRACT

An adaptive bit rate system uses adaptive streaming to deliver content to client devices capable of adaptive bit rate streaming. Techniques for averting or inhibiting ad skipping by an adaptive bit rate client device that receives media chunks from the adaptive bit rate system may include techniques for both live content and on demand content. Techniques include modifying a buffer size for access to trick plays and/or constructing a manifest file with limited content based on ad breaks.

19 Claims, 11 Drawing Sheets

(51) Int. Cl.

| | | |
|---|---|---|
| *H04N 21/81* | (2011.01) | |
| *H04N 21/6587* | (2011.01) | |
| *H04N 21/234* | (2011.01) | |
| *H04N 21/6373* | (2011.01) | |
| *H04N 21/472* | (2011.01) | |
| *H04N 21/2387* | (2011.01) | |
| *H04N 21/262* | (2011.01) | |
| *G06Q 30/02* | (2012.01) | |
| *H04L 29/06* | (2006.01) | |

(52) U.S. Cl.
CPC .. *H04N 21/26258* (2013.01); *H04N 21/47202* (2013.01); *H04N 21/6373* (2013.01); *H04N 21/6587* (2013.01); *H04N 21/812* (2013.01)

(56) References Cited

U.S. PATENT DOCUMENTS

| | | | | |
|---|---|---|---|---|
| 9,160,540 | B2* | 10/2015 | Xu | H04L 9/3247 |
| 2011/0314130 | A1* | 12/2011 | Strasman | H04L 29/06 709/219 |
| 2012/0042090 | A1 | 2/2012 | Chen et al. | |
| 2012/0197419 | A1 | 8/2012 | Dhruv et al. | |
| 2013/0031580 | A1 | 1/2013 | Keum et al. | |
| 2013/0091521 | A1 | 4/2013 | Phillips et al. | |
| 2013/0311670 | A1* | 11/2013 | Tarbox | H04N 21/2387 709/231 |
| 2014/0040026 | A1* | 2/2014 | Swaminathan | G06Q 30/02 705/14.53 |
| 2014/0150019 | A1 | 5/2014 | Ma et al. | |
| 2014/0189139 | A1 | 7/2014 | Cheng et al. | |
| 2014/0279852 | A1 | 9/2014 | Chen | |
| 2014/0281010 | A1 | 9/2014 | Panje et al. | |
| 2015/0033023 | A1* | 1/2015 | Xu | H04L 9/3247 713/176 |
| 2015/0067722 | A1* | 3/2015 | Bjordammen | H04N 21/23424 725/32 |
| 2015/0249869 | A1* | 9/2015 | Dhruv | H04N 21/6543 725/32 |
| 2015/0295648 | A1* | 10/2015 | Mutalik | H04B 10/25751 725/131 |
| 2015/0371280 | A1* | 12/2015 | Bjordammen | G06Q 30/0269 705/14.66 |

OTHER PUBLICATIONS

PCT Search Report & Written Opinion, Re: Application No. PCT/US2014/052092, dated Oct. 23, 2014.

\* cited by examiner

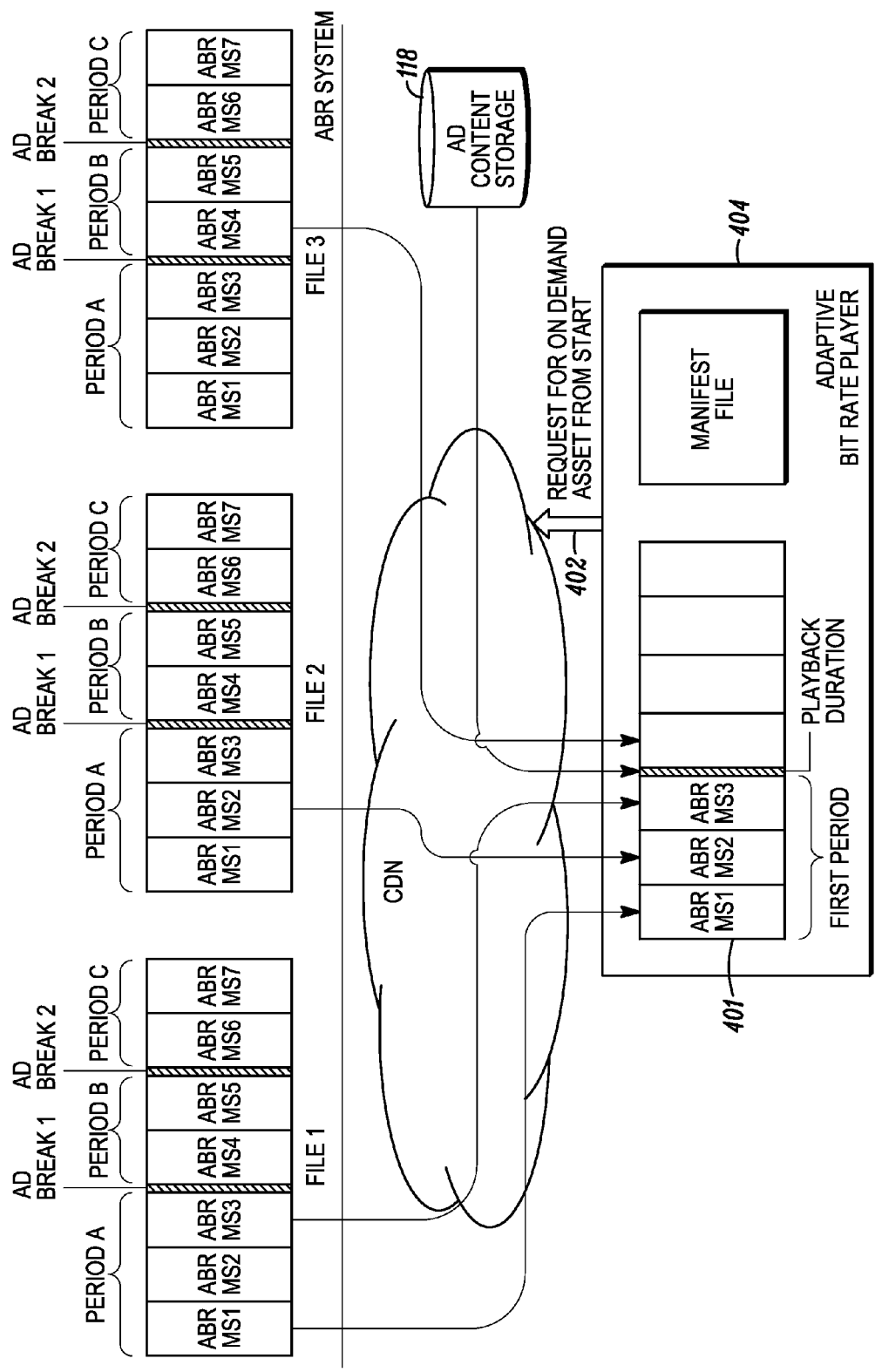

AVERTING AD SKIPPING IN ADAPTIVE BIT RATE SYSTEMS

CROSS-REFERENCE TO RELATED APPLICATIONS

This application is a continuation of U.S. patent application Ser. No. 14/017,455 filed on Sep. 4, 2013, entitled "AVERTING AD SKIPPING IN ADAPTIVE BIT RATE SYSTEMS," the contents of which is incorporated herein by reference in its entirety.

BACKGROUND

An internet protocol video delivery network based on adaptive streaming techniques can provide many advantages over traditional cable delivery systems, such as greater flexibility, reliability, lower integration costs, new services, and new features. However, with the evolution of internet protocol video delivery networks comes a modified architecture for the adaptive bit rate delivery of multimedia content to subscribers. For example, traditional cable operators using legacy delivery networks (e.g., Quadrature Amplitude Modulation based) are trading or supplementing the use of digital controllers, switched digital video systems, video on demand pumps, and edge Quadrature Amplitude Modulation (QAM) devices with smarter encoders, a content delivery network, and cable modem termination systems (CMTS).

Solutions for averting advertisement skipping developed for traditional cable distribution networks and architectures are not suitable for, or have deficiencies when, deployed in the internet protocol video delivery network architectures modified for adaptive bit rate streaming. Advertisement revenue is often critical to the financial viability of an enterprise that distributes multimedia. Thus, as network operators proceed with the development and rollout of internet protocol delivery systems and architectures using adaptive bit rate techniques, effective solutions for ad skipping are desirable.

BRIEF DESCRIPTION OF THE DRAWINGS

For the purpose of illustrating embodiments described below, there are shown in the drawings example constructions of the embodiments; however, the embodiments are not limited to the specific methods and instrumentalities disclosed. In the drawings:

FIG. 4C represents an example of how content from the plurality of differently encoded files shown in FIG. 4B is retrieved.

It is noted that while the accompanying FIGS. serve to illustrate embodiments of concepts that include the claimed invention, and explain various principles and advantages of those embodiments, the concepts displayed are not necessary to understand the embodiments of the present invention, as the details depicted in the FIGS. would be readily apparent to those of ordinary skill in the art having the benefit of the description herein.

DETAILED DESCRIPTION

Disclosed herein are techniques for averting or inhibiting advertisement skipping in an adaptive bit rate system. As described in more detail, disclosed is a modified packager, the device that prepares media files and their associated manifest files (i.e. playlist files) for delivery to a client. The modifications address at least two major categories of programming content delivered to adaptive bit rate clients: live content and on demand content. As described herein, in both cases the techniques disclosed allow for the system to distinguish between standard subscribers and premium subscribers.

Figure 1:
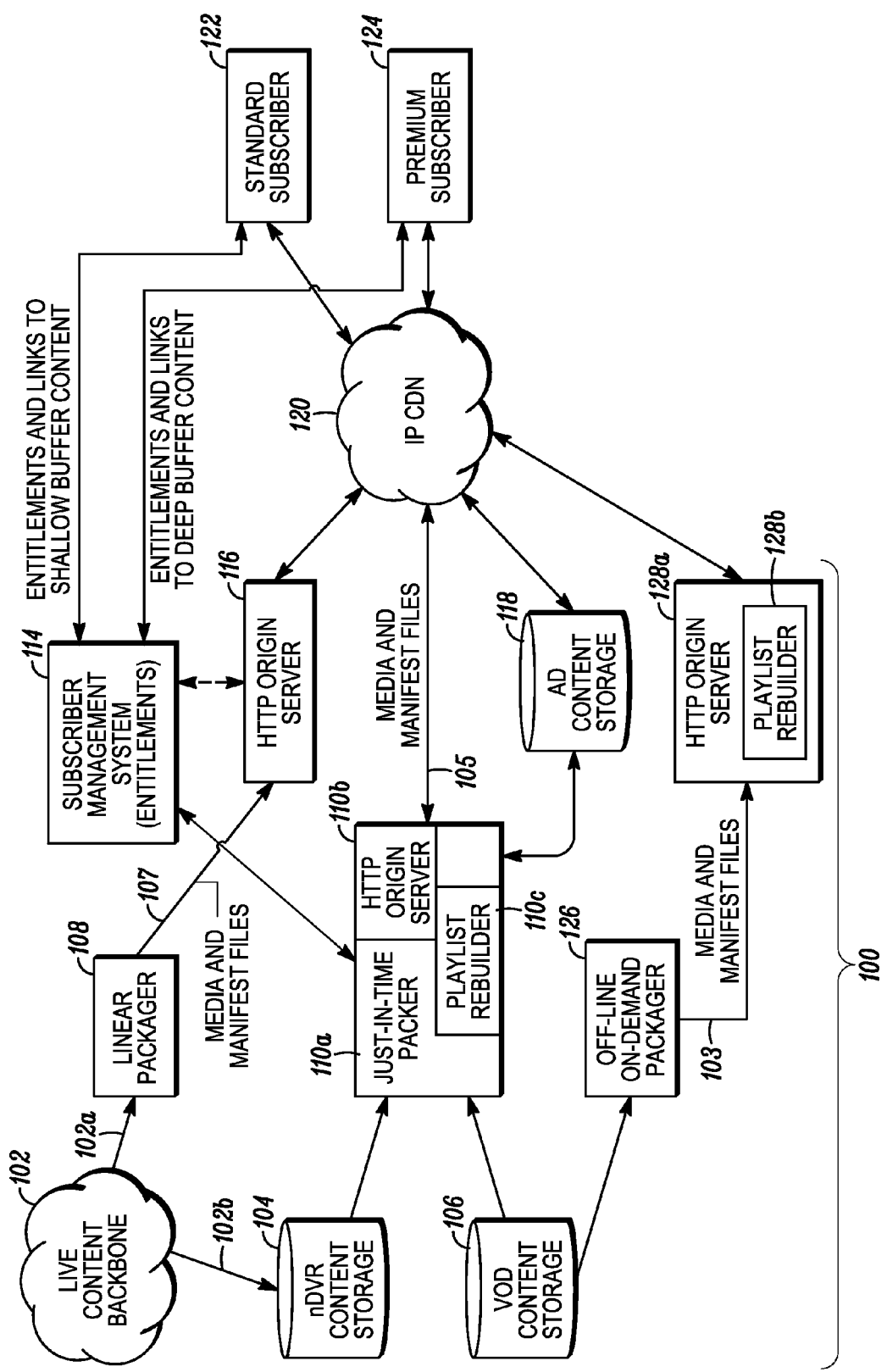
FIG. 1 depicts a high level illustration of a representative adaptive bit rate system with ad skip prevention.

FIG. 1 depicts a high level illustration of a representative adaptive bit rate system 100 that delivers content to adaptive bit rate client devices 122 and 124 via an internet protocol content delivery network 120. An adaptive bit rate client device is a client device capable of providing streaming playback by requesting an appropriate series of segments from an adaptive bit rate system 100 over the internet protocol content delivery network (CDN) 120. The representative adaptive bit rate client devices 122 and 124 shown in FIG. 1 are associated with subscribers having different levels of subscription, a standard subscriber and a premium subscriber, respectively. The content provided to the adaptive bit rate system 100 may originate from a live content backbone 102.

An adaptive bit rate system, such as the adaptive bit rate system 100 shown in FIG. 1, uses adaptive streaming to deliver content to its subscribers. Adaptive streaming, also known as ABR streaming, is a delivery method for streaming video using an Internet Protocol (IP). As used herein, streaming media includes media received by and presented to an end-user while being delivered by a streaming provider using adaptive bit rate streaming methods. Streaming media refers to the delivery method of the medium rather than to the medium itself. The distinction is usually applied to media that are distributed over telecommunications networks, e.g., "on-line," as most other delivery systems are either inherently streaming (e.g., radio, television) or inherently non-streaming (e.g., books, video cassettes, audio CDs). Hereinafter, on-line media and on-line streaming using adaptive bit rate methods are included in the references to "media" and "streaming."

Figure 7:
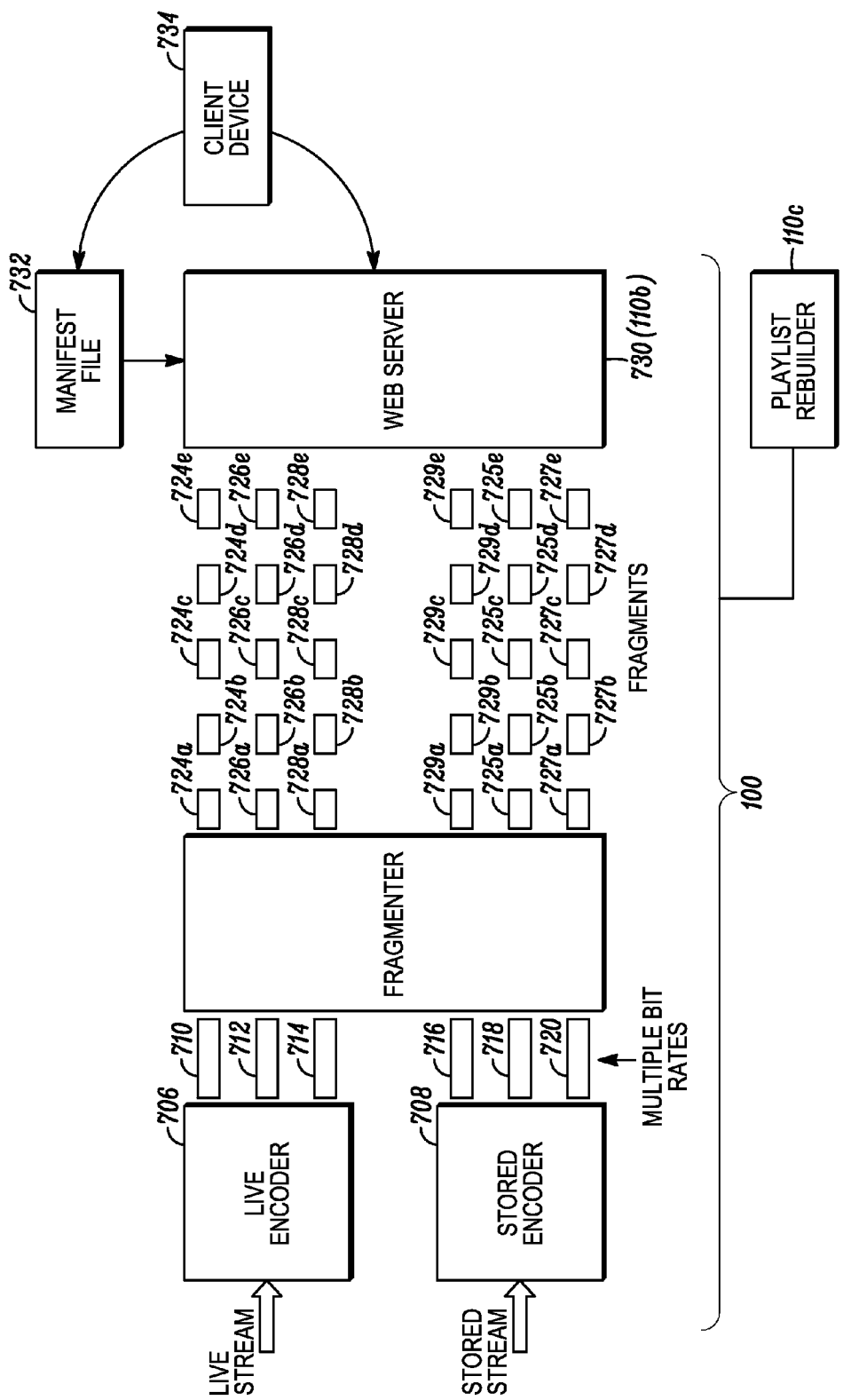
FIG. 7 illustrates components for example components in an adaptive bit rate streaming system.

Adaptive bit rate streaming, discussed in more detail below with respect to FIG. 7, is a technique for streaming multimedia where the source content is encoded at multiple bit rates. It is based on a series of short progressive downloads applicable to the delivery of both live and on demand content. Adaptive bit rate streaming works by breaking the overall media stream into a sequence of small file downloads, each download loading one short segment, or chunk, of an overall potentially unbounded transport stream.

As used herein, a chunk is a small file containing a short video segment (typically 2 to 10 seconds) along with associated audio and other data. Adaptive streaming may use the Hypertext Transfer Protocol (HTTP) as the transport protocol for these video chunks. For example, 'chunks' or 'chunk files' may be short sections of media retrieved in an HTTP request by an adaptive bit rate client. In some cases these chunks may be standalone files, or may be sections (i.e. byte ranges) of one much larger file. For simplicity the term 'chunk' is used to refer to both of these cases (many small files or fewer large files).

It is desirable for the network operator of the adaptive bit rate system 100 to control the skipping of ads by subscribers from their adaptive bit rate client devices 122, 124. Such control, however, is inherently difficult in an adaptive bit rate system because 1) adaptive bit rate client devices are a wide variety of consumer products running different operating systems, often with adaptive bit rate client software that is not under control of the network operator, and 2) given the nature of the adaptive bit rate 'pull' model, where the client directly requests and retrieves media content chunks at its own pace as a function of network traffic and other factors, network components have less control over the streaming of media files compared to traditional video on demand (VOD) streaming systems (be it over QAM or IP network). The net result is the adaptive bit rate client device, which the network operator may not control, is able to dictate the pacing of content and is thus generally able to skip ads.

Further, an implication of adaptive bit rate systems is that the client has by default wide latitude with respect to its access to media chunks. The client is generally free to skip around within the asset, fast forward, rewind, pause, jump ahead, without the same control or even knowledge of the network, relative to more traditional video delivery networks (e.g. HFC/QAM-based broadcast or VOD or SDV video services). With respect to the ability to skip ad content, then, by default, the adaptive bit rate client has more freedom to skip ads than would a comparable QAM-based video client.

Disclosed herein are techniques in an adaptive bit rate system to minimize, inhibit, or prevent ad skipping by subscribers of the internet protocol TV network. As described below, embodiments include those with aspects of network control for manipulating manifest files generated by a packager to manipulate the access to and delivery of the adaptive bit rate media segments to adaptive bit rate client devices.

The example adaptive bit rate system 100 depicted in FIG. 1 includes a network digital video recorder (nDVR) content storage 104, a VOD content storage 106, a linear packager 108, a just-in-time packager 110a, an offline on demand packager 126, HTTP origin servers 110b, 116 and 128a, playlist rebuilders 110c and 128b, and a subscriber management system 114. The adaptive bit rate system 100 also includes an interface to the live content backbone 102 and the internet protocol content delivery network 120. The ad content storage device 118 represents an ad content provider that may be controlled by the internet protocol TV network provider or an ad content provider that is managed separately from the IP network.

The components between the live content backbone 102 and the IP content delivery network 120 in the adaptive bit rate system 100 (e.g., content storage 104, 106, packagers 108, 110a, and 126, origin servers 116, 110b, and 128a, playlist rebuilders 110c and 128b, and subscriber management system 114) may be located in a headend or other suitable location within a content provider network. A cable television headend is a master facility for receiving television signals for processing and distributing content over a cable television system. The headend typically is a regional or local hub that is part of a larger service provider distribution system, such as a cable television distribution system. An example is a cable provider that distributes television programs to subscribers, often through a network of headends or nodes, via radio frequency (RF) signals transmitted through coaxial cables or light pulses through fiber-optic cables. In embodiments, content is received at the headend from a content source (such as a content server of a program provider).

The adaptive bit rate system 100 receives content from a content source, represented by the live content backbone 102. The live content backbone 102 represents any number of possible cable or content provider networks and manners for distributing content (e.g., satellite, fiber, the Internet, etc.). The example live content backbone 102 is a non-limiting example of a content source for adaptive bit rate streaming, which may include any number of multiple service operators (MSOs) or Telcos, such as cable and broadband service providers who provide both cable and Internet services to subscribers, and operate content delivery networks in which Internet Protocol (IP) is used for delivery of television programs (i.e., IPTV) over a digital packet-switched network.

When a subscriber requests content from a respective adaptive bit rate client device 122, 124, the content may be retrieved from any one of the live content backbone 102, network digital video recorder (nDVR) content storage 104, or video on demand (VOD) content storage 106. The live content backbone 102 may be the source of the content 102b that is made available at the headend via VOD content storage device 106 or nDVR content storage device 104. Accordingly, a subscriber may request a live stream, a video on demand asset, or a network DVR asset over the content delivery network (CDN). The adaptive bit rate system may include an interface provided to subscribers to select video or audio content. In embodiments, the adaptive bit rate system 100 may deliver live content to adaptive bit rate client devices 122, 124 over the internet protocol content delivery network (IP CDN) 120.

Examples of a content delivery network 120 include networks comprising, for example, managed origin and edge servers or edge cache/streaming servers. The content delivery servers, such as edge cache/streaming server, deliver content and manifest files (e.g., via one or more wired and/or wireless telecommunication networks, not pictured) to IP subscribers 122 or 124. In an illustrative example, content delivery network 120 comprises an access network that includes communication links connecting origin servers to the access network, and communication links connecting distribution nodes and/or content delivery servers to the access network. Each distribution node and/or content delivery server can be connected to one or more adaptive bit rate client devices; e.g., for exchanging data with and delivering content downstream to the connected IP client devices. The access network and communication links of content delivery network 120 can include, for example, a transmission medium such as an optical fiber, a coaxial cable, or other suitable transmission media or wireless telecommunications. In an exemplary embodiment, content delivery network 120 comprises a hybrid fiber coaxial (HFC) network.

The adaptive bit rate client device associated with a user or a subscriber may include a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by ITU-T H.263 (MPEG-2) or ITU-T H.264/MPEG-4, Part 10, Advanced Video Coding (AVC), the upcoming High Efficiency Video Coding (HEVC) standard, and extensions of such standards, to transmit and receive digital video information more efficiently.

The network based digital video recorder (nDVR) content storage device 104 represents content stored at the network via a network based digital video recorder (nDVR) service. An nDVR video asset is stored at the provider's central location rather than at the consumer's private home. Similar to a personal video recorder at the user's home, the nDVR service allows the end user to access recorded programs at will rather than restricted to the scheduling of the live broadcast. However, an nDVR service captures, in the network on a server, real-time broadcast television which can be selected for later playback. Thus, nDVR subscribers can utilize the network for recording content, rather than requiring a local device or local storage. Recordings specifically designated for a particular client are stored in the network. The content provider may utilize a larger number of nDVR servers on which subscribers' media content may be stored. The nDVR content is similar to live content in that the content is packaged for delivery to the user in real time, but playback is expected to be after the fact.

The video on demand (VOD) content storage device 106 represents video and audio content selected by the content provider for availability to a user on demand. Similar to the nDVR service, the VOD service allows the end user to access recorded programs at will rather than restricted to the scheduling of the live broadcast. However, in contrast to content explicitly recorded via a DVR at the request of a subscriber and made available to the requesting subscriber, VOD content is stored content made available by the content provider to subscribers for viewing at their discretion. The VOD content may be available to any subscribers of the content. The content provider's video on demand library can consist of thousands of movies, network and premium television programs, sporting events, children's programming, music videos, weather information, and more.

As shown in FIG. 1, the adaptive bit rate system 100 may deliver live content 102*a* to a subscriber 122, 124 over an IP CDN 120 via a path that includes a linear packager 108 and an origin server 116. The adaptive bit rate system 100 may deliver nDVR content or VOD content to a subscriber 122, 124 via a path that includes the just-in-time packager 110*a* that resources the playlist rebuilder 110*c* and HTTP origin server 110*b*. The adaptive bit rate system 100 may deliver VOD content to a subscriber 122, 124 via a path that includes an off-line on demand packager 126 and an HTTP origin server 128*a* that resources the playlist rebuilder 128*b*.

Generally, an adaptive bit rate packager is responsible for preparing ("packaging") individual adaptive bit rate streams. A packager is designed to fragment, or "chunk," media files and to encapsulate those files in a container expected by the particular type of adaptive bit rate client. Thus, a whole video may be segmented in to what is commonly referred to as chunks or adaptive bit rate fragments/segments. The adaptive bit rate fragments are available at different bit rates, each of a finite duration. The adaptive bit rate system generates or identifies the media segments of the requested media content as streaming media content.

Along with the delivery of media, the packager creates and delivers manifest files. As shown in FIG. 1, the linear packager 108 delivers media and manifest files 107 to the origin server 116. The just-in-time packager 110*a* delivers media and manifest files 105 via an origin server 110*b*. The off-line on demand packager 126 delivers media and manifest files 103 to the origin server 128*a*.

The packager creates the manifest files as the packager performs the chunking operation for each type of adaptive bit rate streaming method. In adaptive bit rate protocols, the manifest files generated may include a variant playlist and a playlist file. The variant playlist describes the various formats (resolution, bit rate, codec, etc.) that are available for a given asset or content stream. For each format, a corresponding playlist file may be provided. The playlist file identifies the media file chunks/segments that are available to the client. It is noted that the terms manifest files and playlist files may be referred to interchangeably herein. The client determines which format the client desires, as listed in the variant playlist, finds the corresponding manifest/playlist file name and location, and then retrieves media segments referenced in the manifest/playlist file.

The packager creates the manifest files to be compliant with an adaptive bit rate streaming format of the associated media and also compliant with encryption of media content under various DRM schemes. Thus, the construction of manifest files varies based on the actual adaptive bit rate protocol. Adaptive bit rate streaming methods have been implemented in proprietary formats including HTTP Live Streaming ("HLS") by Apple, Inc., and HTTP Smooth Streaming by Microsoft, Inc. adaptive bit rate streaming has been standardized as ISO/IEC 23009-1, Information Technology—Dynamic Adaptive Streaming over HTTP ("DASH"): Part 1: Media presentation description and segment formats. Although references are made herein to these example adaptive bit rate protocols, it will be recognized by a person having ordinary skill in the art that other standards, protocols, and techniques for adaptive streaming may be used.

In HLS, for example, the adaptive bit rate system 100 receives a media request from a subscriber 122, 124 and generates or fetches a manifest file to send to the subscriber's playback device in response to the request. A manifest file can include links to media files as relative or absolute paths to a location on a local file system or as a network address, such as a URI path. In HLS, an extended m3u format is used as a non-limiting example to illustrate the principles of manifest files including non-standard variants.

As described herein, the packager, such as packager 108, 110*a*, or 126 posts the adaptive bit rate chunks associated with the generated manifest file to an origin server, such as origin server 116, 110*b*, or 128*a*, respectively. Thus, the origin servers 116, 110*b* and 128*b* receive video or multimedia content from one or more content sources via packagers 108, 110*a*, and 126, respectively. The origin server 116, 110*b*, or 128*a* may include a storage device where audiovisual content resides, or may be communicatively linked to such storage devices; in either case, the origin server 116, 110*b*, or 128*a* is a location from which the content can be accessed by the adaptive bit rate client devices 122, 124. The origin server 116, 110b, or 128a may be deployed to deliver content that does not originate locally in response to a session manager.

The origin server 116, 110b, or 128a includes components that together make up a custom playlist from the collections of chunks. For example, for chunks of AV data that each has a unique URI, the custom playlist can be a collection of URIs that make up the complete program (or as disclosed herein, a portion of the program). As will be explained herein, the custom playlist may omit or alter chunks that contain AV content that is not in compliance with a rule set applied by the filter, e.g., non-compliant AV content that is deemed objectionable in a personalized rule set.

As shown in FIG. 1, the content delivery network (CDN) 120 can be communicatively coupled to the origin servers 116, 110b and 128b, and to one or more distribution nodes and/or content delivery servers (e.g., edge servers, or edge cache/streaming servers). The subscriber, via a respective client device, is responsible for retrieving the media file 'chunks,' or portions of media files, from the origin server as needed to support the subscriber's desired playback operations. The subscriber may submit the request for content via the internet protocol content delivery network (CDN) 120 that can deliver adaptive bit rate file segments from the service provider or headend to end-user adaptive bit rate client devices.

Playback at the adaptive bit rate client device of the content in an adaptive bit rate environment, therefore, is enabled by the playlist or manifest file that directs the adaptive bit rate client device to the media segment locations, such as a series of uniform resource identifiers (URIs). For example, each URI in a manifest file is usable by the client to request a single HTTP chunk. The manifest file may reference live content or on demand content. Other metadata also may accompany the manifest file.

At the start of a streaming session, the adaptive bit rate client device 122, 124 receives the manifest file containing metadata for the various sub-streams which are available. Upon receiving the manifest file, the subscriber's client device 122, 124 parses the manifest file and determines the chunks to request based on the playlist in the manifest file. The adaptive bit rate client device 122, 124 can fetch a first media segment posted to an origin server for playback. For example, the user may use HTTP Get or Byterange requests to request media segments. Then, during playback of that media segment, the playback device may fetch a next media segment for playback after the first media segment, and so on until the end of the media content. This process continues for as long as the asset is being played (until the asset completes or the user tunes away). Note that for live content especially, the manifest file will continually be updated as live media is being made available. These live playlists may also be referred to as sliding window playlists.

The use of an adaptive bit rate system that chunks media files allows the client to switch between different quality (size) chunks of a given asset, as dictated by network performance. The client has the capability by using the manifest file, to request specific fragments/segments at a specific bit rate. As the stream is played, the client device may select from the different alternate streams containing the same material encoded at a variety of data rates, allowing the streaming session to adapt to the available network data rate. For example, if, in the middle of a session, network performance becomes more sluggish, the client is able to switch to the lower quality stream and retrieve a smaller chunk. Conversely, if network performance improves the client is also free to switch back to the higher quality chunks.

Since adaptive bit rate media segments are available on the adaptive bit rate system in one of several bit rates, the client may switch bit rates at the media segment boundaries. Using the manifest file to adaptively request media segments allows the client to gauge network congestion and apply other heuristics to determine the optimal bit rate at which to request the media presentation segments/fragments from one instance in time to another. As conditions change the client is able to request subsequent fragments/segments at higher or lower bitrates. Thus, the client can adjust its request for the next segment. The result is a system that can dynamically adjust to varying network congestion levels. Often, the quality of the video stream streamed to a client device is adjusted in real time based on the bandwidth and CPU of the client device. For example, the client may measure the available bandwidth and request an adaptive bit rate media segment that best matches a measured available bit rate.

Thus adaptive bit rate streaming results in an uninterrupted user experience. The client may maintain a temporary cache of a few fragments and requests further fragments at optimally determined rates thus maintaining continuity of playback even through changing network bandwidth conditions.

The origin servers 116, 110b, 128a may store several chunk sizes for each segment in time. The adaptive bit rate client device predicts the available bandwidth and requests the best chunk size, e.g., using the appropriate URI. Since the client is controlling when the content is requested, this is seen as a client-pull mechanism, compared to a push mechanism where the server pushes the content. Using URIs to create the manifest file enables very simple client devices to retrieve chunks using web browser-type interfaces.

It is desirable for the network operator to limit the skipping of ads on adaptive bit rate client. For example, network operators and content providers are often motivated to prevent (or at least control to some degree) the skipping of ads (as is commonly done on on demand content) on ad supported programming. Network operators of traditional video delivery networks do block the skipping of ads, either using special logic in proprietary client software, or via the control of video-on demand streaming servers. Also, for web based content there is some prevention of ad skipping by forcing the playback of ads before an asset can be viewed, or before the web page is fully populated. Such control, however, is inherently difficult in an adaptive bit rate system.

With the move to the adaptive bit rate (adaptive bit rate) systems, the problem of ad skipping is likely to become worse, since third party clients have more control over the video stream manipulation relative to traditional video delivery systems. As noted, it is likely that in many cases the adaptive bit rate client will be 'standard' (i.e. provided by a third party or native to the consumer device). Thus it may not be feasible for well behaved ad skip prevention to be designed into the client. The problem is therefore to effectively avert/control ad skipping such that the aversion/control exists in network elements (under control of the service provider) without requiring special client behavior/cooperation.

Disclosed herein are manners to avert ad skipping in an adaptive bit rate system for both on demand and live content. As described above, FIG. 1 depicts three example types of packagers for chunking media files and generating manifest files are illustrated. The example packagers include a linear packager 108, a just-in-time packager 110a, and an off-line on demand packager 126. The linear packager 108 is dedicated to the processing of linear (a.k.a. broadcast) content.

The just-in-time packager 110a is dedicated to on demand content (such as VOD and nDVR). The off-line on demand packager 126 is dedicated to processing video on demand content.

Figure 2:
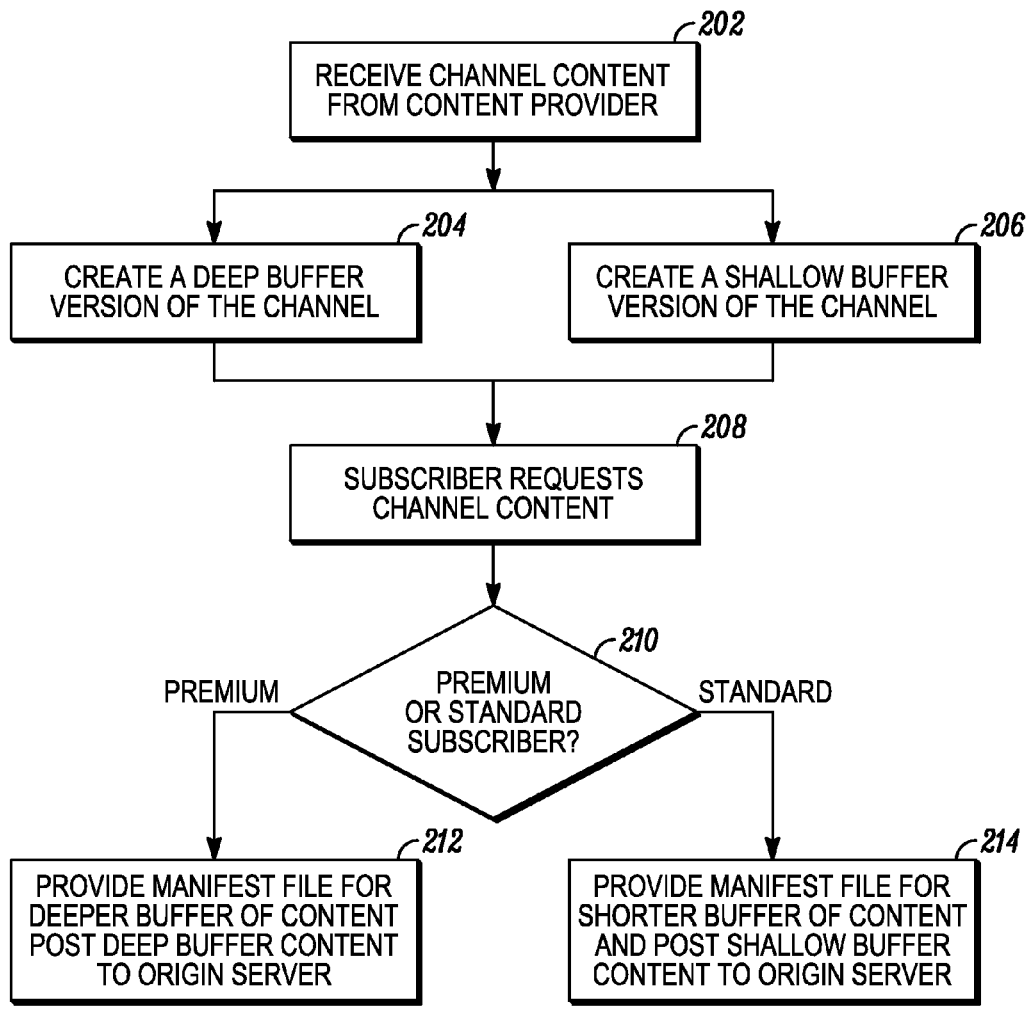
FIG. 2 depicts an example flow diagram for preventing or minimizing ad skipping at an adaptive bit rate client device.

FIG. 2 depicts a flow diagram for a manner for the network to avert or minimize ad skipping at the client device when delivering live content. At 202, a packager receives content from a content provider. As shown in FIG. 1, the delivery of live content by the adaptive bit rate system 100 to an adaptive bit rate client device 122, 124 over an IP CDN 120 may be via the path that includes a linear packager 108 and an HTTP origin server 116.

The linear packager 108 packages a live content stream as it is received from the content provider at 202 and packages it for access by a variety of clients, more or less at the same time. Effectively the live content is the same as that on the linear broadcast channels, and the linear packager 108 prepares the content for consumption for a variety of adaptive bit rate clients that may be concurrently accessing the same content files. The work in the linear packager 108 is done independent of individual adaptive bit rate client requests. For example, multiple users receive the same manifest, e.g., the linear packager 108 may support a thousand clients. In an adaptive bit rate system, the content files may be served to the adaptive bit rate clients over an IP CDN 120 (sitting between the HTTP origin server and the clients), in order to satisfy the load of many concurrent requests from geographically dispersed clients.

To minimize ad skipping in the live content scenario, the linear packager 108 creates two versions of each linear channel: a deep buffer version at 204 and a shallow buffer version at 206. In this embodiment, therefore, the system supports at least two copies of each live service. It should be noted that the embodiment supporting two versions of the live service is a non-limiting example, as any number of versions may be maintained depending on the needs of the system. The versions of the same channel may be maintained separately in the system, therefore appearing as different channels in the channel maps. Further, each version may have separate sets of variant playlists and playlist files. Further, the entitlements of each version may be different and maintained separately to give different access rights to different subscribers. As described below, for example, only premium subscribers may have access rights to the deep buffer version(s) of the live channel(s)).

When processing live content, the packager can effectively control the extent of ad skipping available to a subscriber by controlling the depth of the buffer of live content (e.g., to less than 30 seconds or only a few media chunks). The linear packager 108 continually updates the manifest files (e.g., a sliding window playlist) and then processes new media chunks, continually posting the content (including manifest files and media chunks) to the origin server. Content published once to the HTTP origin server 116 may be accessed by any number of clients and then deleted.

In creating the shallow buffer, the linear packager 108 continually deletes old media chunks so that only a minimal number of media chunks is maintained on the HTTP origin server (and in the content delivery network). With a shallow buffer of content, there is no or limited ability to fast forward through ads or any other content. For example, if only 30 seconds of older media chunks are kept in the origin server, the adaptive bit rate client can be no more than 30 seconds behind live in the buffer, and any attempt to skip ahead (during an ad or elsewhere) will quickly result in the client catching up to live, at which point the client can skip forward no more.

Thus, in embodiments, the shallow buffer version of the content created at 206 deletes older content (e.g., older than a few minutes) from the origin server by the linear packager 108, more or less at the same rate that the linear packager 108 is adding new media chunks. In an example, the corresponding manifest file may include two minutes of content that is available at any given time. If there are ten second media segments, the manifest file has twelve segments and every few seconds all media segments are removed and new segments are available.

The deep buffer version of the content created at 204 maintains content in a buffer for a longer duration than the shallow buffer version before deleting the content. For example, 30 minutes of content may be stored in the deep buffer such that the client is working with a buffer of older content. In other words, for fast forward to work with live content, the client must have access to a buffer having a depth maintaining formerly live content (at least a few minutes old), so that when the ad breaks come and the client tries to skip ahead, the client is able to skip forward in the buffer without catching up to live. The linear packager 108 may leave some amount of old media chunks on the origin server (maybe a few minutes worth of content per channel) to allow for some amount of 'rewind' capability.

The distinction between subscribers is the amount of buffering available. At 208 a subscriber requests channel content from an adaptive bit rate system 100. The version of content available to the user is determined by the adaptive bit rate system, such as through the subscriber management system 114. At 210, the adaptive bit rate system 100 determines whether the subscriber requesting channel content at 208 is a premium subscriber or a standard subscriber. In an example, assume the premium subscriber is the higher paying subscriber that is provided with more options than the lower paying standard subscriber. For simplicity, only two subscription levels are described to illustrate the varying levels of access to buffer content. It should be understood, however, that any number of levels of subscriptions may be available with various levels of access.

At 212, premium subscribers are directed to the deep buffer version of the content, while at 214 standard subscribers are directed to the shallow buffer version of the content. For example, the premium subscriber would be directed to (via a 'channel map') and entitled for the deep buffer version, while the standard subscriber would be directed to and entitled for the shallow buffer version. The manifest file and adaptive bit rate media segments for the content are published to the origin server 116. The origin server publishes the content and any client that requests the content is directed to the origin server. In the example of a 30 minute deep buffer, the premium subscriber may be provided with a manifest file that directs the user to 30 possible minutes of media segments that are posted to an origin server accessible by the premium subscriber. The standard subscriber, on the other hand, may be provided with a manifest file that directs the user to two minutes worth of media segments that are posted to an origin server accessible by the standard subscriber.

Thus, the premium subscriber would be directed to manifest files with a deeper buffer, allowing a user access to a deep buffer of content, e.g., 30 minutes of content. The depth of the buffer may be determined based on a frequency of ad breaks. For example, if in a sixty minute program there are three 10 minute ad breaks, the deep buffer access for the premium subscriber may hold sixty minutes of content. The user may pause the content and allow all sixty minutes of media segments to buffer, using the manifest file updated with each segment available in the buffer and accessing the origin server also updated with each segment as it becomes available.

In an embodiment, the user may pause live content. For example, 10 minutes in to the buffer the user may pause, such that the 10 minutes of formerly played content is buffered. While watching the 10 minutes of buffered content, new content is buffered, such that up to 30 minutes worth in this example is buffered. The user can then fast forward through an ad break within that depth of content while playing through the deep buffer. Thus, the deep buffer version enables the premium subscriber to play older content (up to 30 minutes older in the example described) and thus fast forward through ads that would otherwise be delivered in that 30 minute period. The premium subscriber may not have to wait for an ad to be done, but can adaptively decide how long to wait before buffering can re-occur.

The shallow buffer version, on the other hand, limits ad skipping because there is no ability for the adaptive bit rate to play from older content (stored on the server), in anticipation of the need to eventual skip forward in time once the ads arrive. In the standard subscriber example, a shallow buffer would not allow as much manipulation of the content. Thus, the shallow buffer version maintains a minimal buffer of the live stream making it near impossible for the standard subscriber to skip ads without going to the trouble of buffering large sections of the media files within the client itself. To buffer large sections (several minutes) of the asset locally (on the client itself) is possible but not expected to be 'normal' for the average (more passive) subscriber.

The linear packager 108 would correspondingly treat the two types of channels differently: for shallow buffer versions the packager would continually delete older media chunks, keeping the buffer depth shallow (e.g., 30 seconds or less). While for deep buffer versions the packager would allow a much deeper buffer, 5 minutes or more, allowing more skip ahead capability. Note that it is assumed with live content that the packager would maintain the media chuck as separate files, rather than as one big file. Keeping separate, small media files would facilitate the continual purging of older content, and, since these older chunks are always being purged, there is no corresponding problem with maintaining many small media files, as is the case with nDVR and VOD content.

Further, the linear packager may omit I-Frame references in the manifest file for the ad blocks sections to inhibit fast forward through the ad blocks. While this fast forward is not especially feasible during live playback, the lack of I-Frame references can also inhibit skipping in the event the client attempts to locally buffer large sections of the program.

Figure 3:
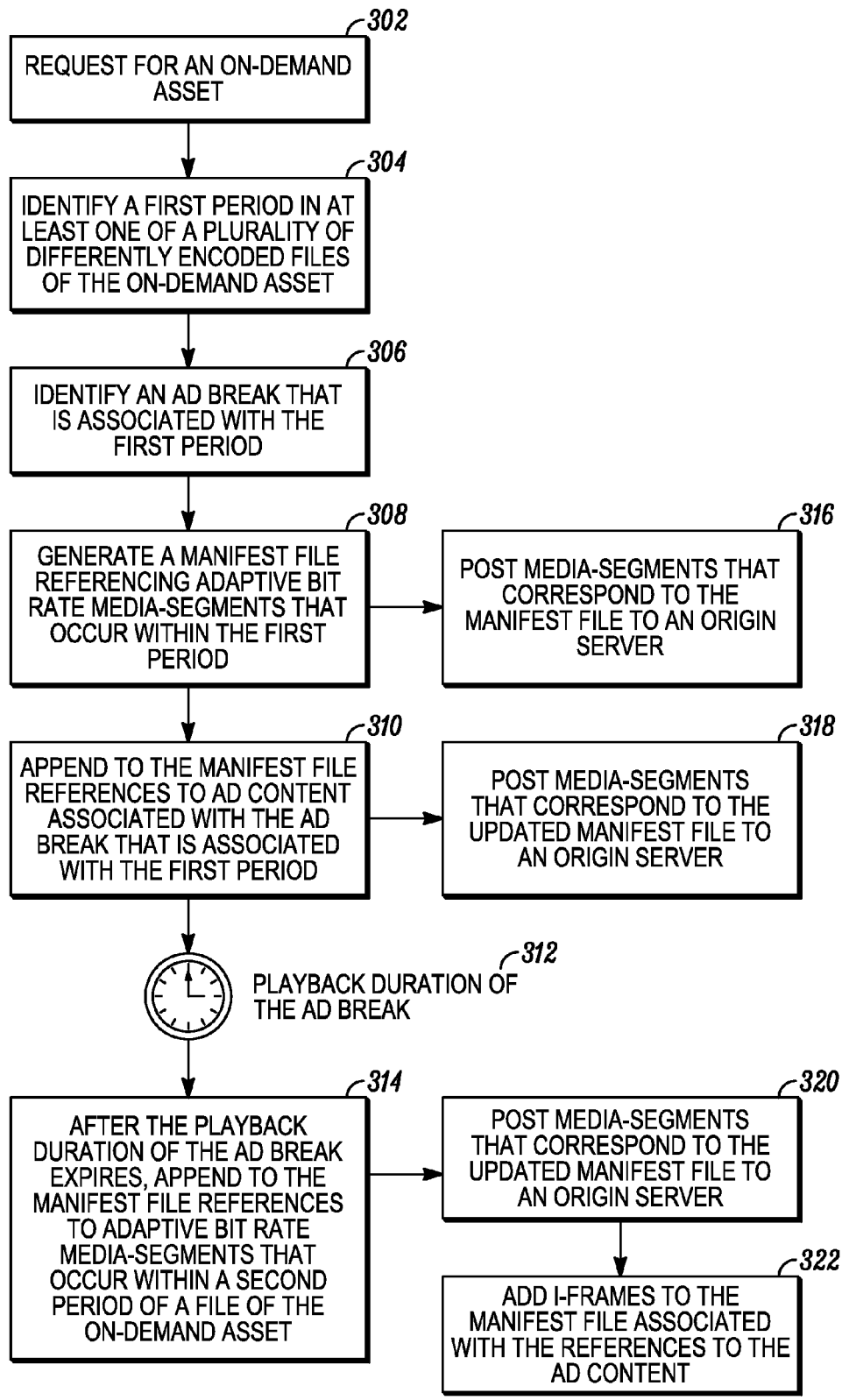
FIG. 3 depicts another example flow diagram for preventing or minimizing ad skipping at an adaptive bit rate client device.

FIG. 3 depicts a flow diagram illustrating a method for preventing or minimizing ad skipping when on demand content (e.g., VOD or nDVR content) is requested from an adaptive bit rate client. As described in more detail below, in the on demand case, the packager prevents or limits ad skipping for subscribers by limiting the adaptive bit rate client's knowledge of the media files (via limiting the references in the manifest/playlist).

At 302, a subscriber makes a request for an on demand asset from an adaptive bit rate system. As shown in FIG. 1, in embodiments, the sources of on demand content may be the nDVR content storage device 104 or the video on demand content storage device 106. For example, the on demand asset may be a movie or a television program recorded in the nDVR storage device 104 and selected for playback or a movie or a television program available through the content provider and selected from the video on demand content storage device 106. While nDVR and VOD content is described, on demand content may include any content that is not delivered live to the user or is otherwise stored by the adaptive bit rate system and available upon request.

The delivery of nDVR or VOD content by the adaptive bit rate system 100 to a subscriber over the IP CDN 120 may be via a path that includes a just-in-time packager 110a and HTTP origin server 110b. The just-in-time packager 110a operates differently from the linear packager 108 (that handles live content as it is received from the content provider and operates independent from individual client requests). In embodiments the just-in-time packager 110a receives HTTP requests for manifest files directly from adaptive bit rate clients, and the just-in-time packager 110a is used only to satisfy a specific client session based on that request. Further, the just-in-time packager 110a processes content in real time in response to an individual client request, and packages content specific for that individual client. For example, the content may not be immediately packaged upon receipt from the live content backbone 102 and may not be available for request from a multitude of users. In fact, some on demand content may never be requested and therefore does not get packaged. The just-in-time packager 110a is thus well-suited to satisfy requests for on demand content like VOD or nDVR.

The just-in-time packager 110a disclosed herein generates a manifest file that is carefully constructed to minimize ad skipping by the client. Because fetching and displaying segments is under client control in adaptive bit rate system, an adaptive bit rate client device may request any content segment described in the manifest or playlist. The control by the client makes it difficult to enforce client behavior from the server as is possible in push mode delivery systems (i.e. traditional VOD over QAM or IPTV). The disclosed just-in-packager 110a includes a mechanism for preventing, or at least dissuading, viewers from skipping ads when viewing content delivered by an adaptive bit rate system.

As described herein, adaptive bit rate streaming works by breaking the overall media stream into a sequence of small file downloads, each download loading one short segment, or chunk, of an overall potentially unbounded transport stream. To facilitate understanding of the flow diagram in FIG. 3, FIG. 4A depicts an example of an asset file with a timeline including representative media and ad segments, and FIG. 4B depicts a simplified example of asset files for purposes of illustrating the just in time packager functionality.

Figure 4A:
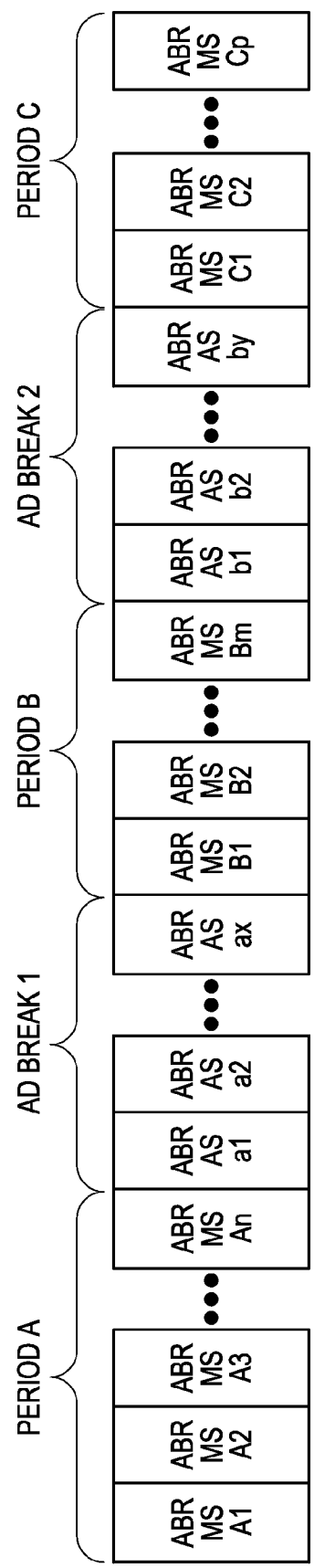
FIG. 4A depicts an example of an asset timeline with representative media and ad segments.
Figure 4B:
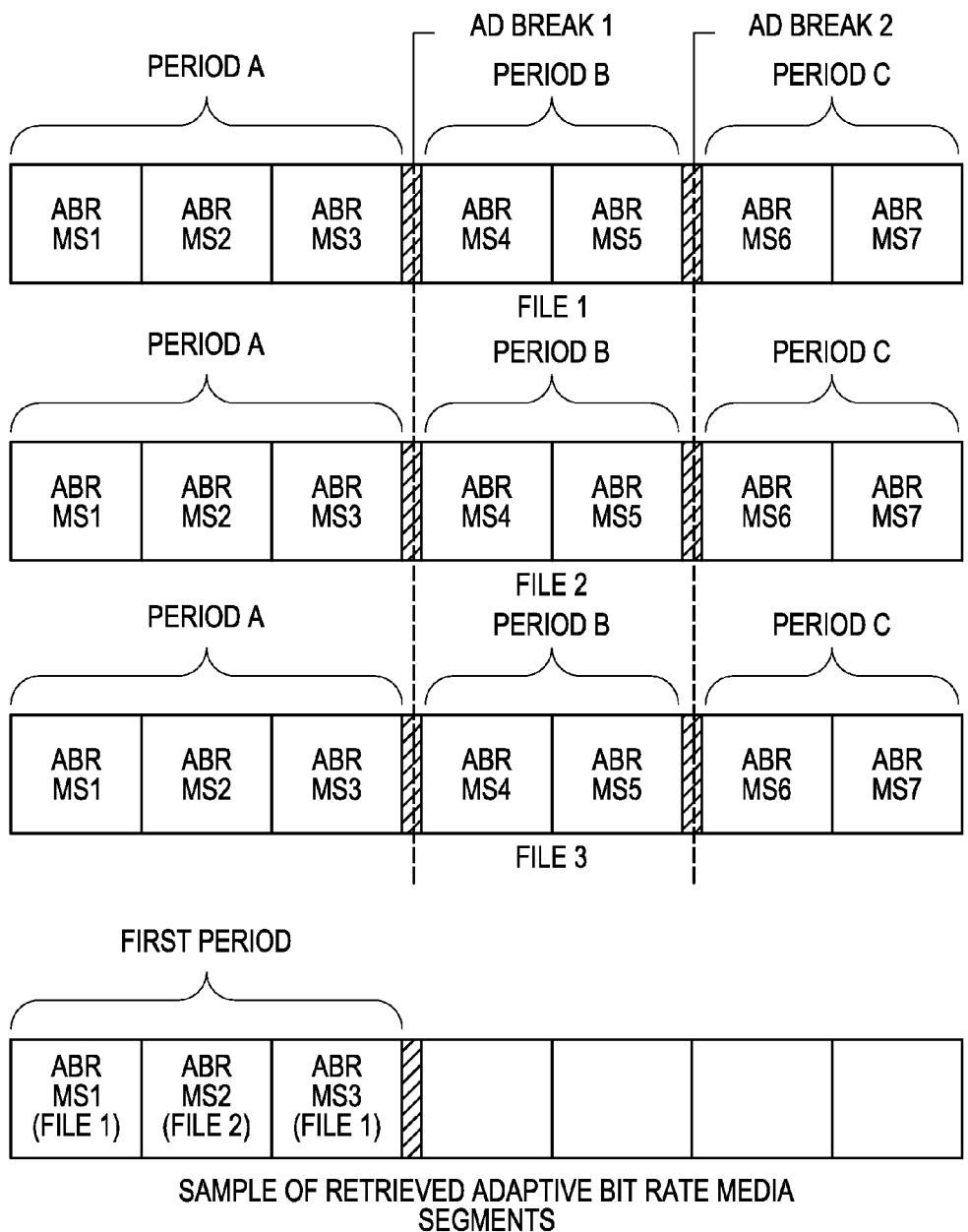
FIG. 4B depicts an example of files that represent differently encoded versions of the same requested on demand asset.

FIG. 4A depicts an example asset file segmented into media segments and ad segments. An asset file may include several periods separated by ad breaks. Shown in FIG. 4A for purposes of illustration are three media content periods, period A, period B, and period C, separated by ad breaks, ad break 1 and ad break 2. A period represents a block of content of a finite duration within the on demand asset. Each period of the asset file shown in FIG. 4A is sliced in to segments, sometimes referred to as chunks, e.g., ABR MS A1-An in period A, ABR MS B1-Bn in period B, and ABR MS C1-Cn in period C.

The segment lengths for either of the media periods or ad breaks may vary, and may be a function of the length of the asset/ad and the adaptive bit rate streaming characteristics. In an example, period A is 15 minutes long and each segment is 10 seconds long, such that period A includes 90 media segments (ABR MS A1-ABR MS A90). In an example, ad break 1 is 4 minutes long and the ad break segments ABR AS al-ax are 2 second long segments.

While three periods and two ad breaks are depicted in FIG. 4A, each with an unspecified number of segments, the representative asset timeline is a non-limiting example, as the timeline for an asset file may have a different number of periods, a different number of segments in each period, and a different number of ad break periods from what is shown.

FIG. 4B depicts three example asset files, File 1, File 2, and File 3, with ad breaks. File 1, File 2, and File 3, are shown in FIG. 4B as segmented into adaptive bit rate media segments ABRMS1, ABRMS2, ABRMS3, ABRMS4, ABRMS5, ABRMS6, ABRMS7. It is noted that the use of seven segments is a non-limiting example, as differently encoded files for a given on demand asset are usually segmented differently than shown. The asset file and the ad breaks may be segmented in to any suitable length. For example, the asset file segments may be 10 seconds in duration, but the segments could be 2 seconds or 2 minutes. As described above, a 15 minute period with 10 second segments would result in 90 segments. FIG. 4B depicts only a limited number or segments in each file and simplifies the representation of each ad break for simplicity in describing segment retrieval. The time shown in the figures are representative and are not meant to be to scale or limit the duration of the segments and ad breaks to any specific length.

Each of the files, File 1, File 2, and File 3, represents a version of the same requested on demand asset, but encoded by the packager at different bit rates. The just in time packager 110a is further designed to segment the requested on demand asset in to what is commonly referred to as chunks or adaptive bit rate media segments. The packager segments each of the differently encoded files File 1, File 2, and File 3 in to adaptive bit rate media segments. While synching is not a requirement, in embodiments enabling quality level switches between files to occur without artifacts, the start positions of corresponding chunks align between the various quality levels/files.

At 304, the just-in-time packager 110a identifies a first period in at least one of the plurality of differently encoded files, File 1, File 2, and File 3, of the requested on demand asset. The first period is associated with the request for the on demand asset, i.e., the period within which an adaptive bit rate media segment associated with the request for the on demand asset is located.

Each of the differently encoded files, File 1, File 2, and File 3, comprises a plurality of periods A, B, and C separated by ad break periods, shown as ad breaks 1 and 2. Each content period includes a plurality of adaptive bit rate media segments. As illustrated by way of example, period A of Files 1, 2, and 3 includes adaptive bit rate media segments ABRMS1, ABRMS2, and ABRMS3. It is noted that throughout this disclosure reference is made to a first period and a second period to distinguish between two periods within a file. A "first" period or a "second" period does not necessarily correspond to the location of the period within the file. For example, the first period in File 1 may be period A, B, or C.

As shown in FIG. 4B, a period represents a block of content of a finite duration within the on demand asset. A period may be generally defined as a finite period of adaptive bit rate media segments associated with a respective ad break. A period may be the period between a start point of the on demand asset and a start of a first ad block, such as period A. A period may be the period between two ad blocks within the on demand asset, such as example period B. A period may be the period between the end of the on demand asset and a last ad block, such as period C.

In an example, the request for an on demand asset at 302 is a request for content that starts at the beginning of the asset, such that the request is associated with the first adaptive bit rate media segment of the on demand asset, shown as ABRMS1. In this example, period A is the first period identified in the plurality of differently encoded files of the on demand asset in which ABRMS1 associated with the request is located.

Referring back to the flow diagram in FIG. 3, at 306, an ad break associated with the first period is identified. As shown in FIG. 4B, if period A is the first period, ad break 1 is identified as the ad break associated with the first period. There are a couple of ways for the just in time packager 110a to identify locations of the ad breaks. For example, in embodiments the packager may parse SCTE-35 messages carried within the MPEG transport stream of the inbound stream. SCTE-35 messages identify the splice in and out points (i.e., the ads). In embodiments, the packager locates the ad blocks using metadata for the stored asset, such as an index file or a DASH manifest file that may have been created and stored by the VOD or nDVR ingest/recording subsystem. The packager may use any reliable mechanism to identify where in the content stream the ads can be found.

At 308, the manifest file generated by the adaptive bit rate system references adaptive bit rate media segments that occur within the first period. The packager generates a manifest file to lists the contents of a distribution, providing a table of contents of the video identifying the different representations of the requested on demand asset available to the requesting adaptive bit rate client device. In this manner, the manifest file gives multiple versions of the requested adaptive bit rate media segment for selection by the user based on the adaptive bit rate client device capabilities. The server may initially send the client the manifest file to enumerate the files which are included in a distribution.

In this example, the manifest file generated at 308 for the Files shown in FIG. 4B includes references to the adaptive bit rate media segments found in period A of each of files 1, 2, and 3 thereby only referencing the adaptive bit rate media segments in the first period. Thus, in accordance with the techniques disclosed, at 308, the initial manifest file is carefully constructed or rebuilt to reference content only up to a first ad break.

The manifest file, therefore, limits access by the adaptive bit rate client device to media segments in the first period; the adaptive bit rate client does not initially have access to content in other periods, or ads. Accordingly, the adaptive bit rate client device cannot perform trick plays on content in the other periods, but only on content within the single period for which the manifest file includes references. The viewer can navigate (e.g. fast forward, rewind) within this initial period, but to play into the next period the adaptive bit rate client device has to request an updated manifest containing additional content.

The appendage to the manifest file with references to ad content at 310 may occur following an indication that the adaptive bit rate client device has received the desired media segments from the first period. Thus, in embodiments, it is not until an indication that the desired adaptive bit rate media segments during the first period have been retrieved or fast forwarded through, that the adaptive bit rate system, at 310, appends references to ad content associated with an ad break associated with the first period to the manifest file.

For example, the packager may append references to ad content associated with Ad Break 1 shown in FIG. 4B.

An indication that the adaptive bit rate client device has received the desired media segments may be an indicator provided to the packager. For example, the adaptive bit rate client device may have played through all of the media segments in the first period and is requesting additional media segments from a second period for continued playback for a user. The indication may be an indicator that the adaptive bit rate client device has fast-forwarded to the end of the available media segments in the first period. The indication may be an indicator that the adaptive bit rate client device has initiated a fast-forward function or a rewind function to retrieve content from a second period where the second period occurs either after the first period or prior to the first period. The indication may be a request for media segments from a second period in the differently encoded files of the on demand asset.

Somewhat incidental to the carefully constructed manifest files is the fact that in embodiments, as illustrated in FIG. 1, the ad content may be stored pre-packaged in an ad content storage 118 location, a location separate from the programming content (e.g., content stored in nDVR and VOD storage servers). The pre-packaged ad content may not need to pass through the just-in-time packager 110*a*, rather the manifest (i.e. playlist) files created by the just-in-time packager 110*a* reference the ad content (in addition of course to the programming content) even though the just-in-time packager 110*a* does not directly chuck the actual ad content (i.e. the ad content is pre-chunked). To change the ads dynamically, the manifest file listing the ads could be deleted and a placeholder can be filled with ads from ad content storage 118.

In embodiments, the ad may be inserted in to the on demand asset or stored with the on demand asset in the adaptive bit rate system, such as in nDVR storage device 104 or VOD content storage device 106. Thus in embodiments, ads may be packaged with the on demand asset and served by an HTTP origin server. For example, VOD content typically includes content selected by a content provided for being available to a user on demand, and the ads are already saved in to the stream. Similarly, a recorded content on a nDVR may include a recording of the ads that played at the time of the live stream. As described in more detail below, FIG. 4E illustrates an example of an asset timeline with ad-insertion by manifest manipulation.

It is noted that while the packager may append references to ad content to the manifest file, the just-in-time packager 110*a* may omit the I-frame references for the ad block sections, thereby impeding trick plays on the ad content during the playback duration (i.e., omitting the I-frame information prevents the client from fast forwarding through the ads). For example, a trick mode playlist may be provided along with the media content playlist(s). Initially, only references to the I-frames of the first period are included. In embodiments, even after the ad-content playlist are provided for ad break 1, the I-frame playlist references to ads are not provided until after the ad timer has expired and the second period playlists have been provided.

Once the manifest/playlist is updated with the references to the ad content at 310, the just-in-time packager 110*a* will not update the manifest/playlist with references to the content following the ads until the full playback duration of the ad break has expired. Following an expiration of the playback duration of the ad break at 312, the adaptive bit rate system appends references to adaptive bit rate media segments that occur within a second period of the on demand asset. Thus, the adaptive bit rate system limits the adaptive bit rate client device, by way of the manifest file, to media segments in the first period until a playback duration of an ad break associated with the period expires at 312.

Logic in an edge server can enforce that the new, post-ad manifest file cannot be fetched until the duration of the ad break has expired at 213. For example, in the case of nDVR and VOD content, when the subscriber first goes to watch an on demand asset, e.g., a 2 hour program with 15 minute periods, the subscriber will receive media segments for the first 15 minutes of the on demand asset and then be forced to wait for an ad break playback duration to expire before being provided additional media segments from a subsequent 15 minute period of the on demand asset.

The adaptive bit rate system 100 may post media segments to an origin server that correspond to the media segments referenced in the manifest file. Thus, the media segments posted to the origin server are updated to match up to the media segments referenced in the current manifest file. For example, media segments corresponding to those referenced in the manifest file at 308 (limited to references to media segments in the first period.) are posted to the origin server at 316. At 318, media segments corresponding to the manifest file updated at 310 (including the reference to ad content in the ad break) are posted to the origin server (in embodiments, with the I-frame playlists omitted). At 320, media segments corresponding to the manifest file updated at 314 (with references to content in a second period of the on demand asset) are posted to the origin server.

The disclosed techniques enable the network operator to support trick play to some extent on the on demand content so the subscriber is able to freely pause, and fast forward and rewind through the programming portions (but not fast forward past the ads). Note that the subscriber is allowed to freely pause, fast-forward and rewind through all the programming segments, but once the subscriber tries to move to the next section of programming (across an ad break), the subscriber is forced to wait the playback duration of the ad block until the chunks for the next programming block are made available (as indicated via references in the manifest file). During this time, the client may or may not actually watch or even fetch the ad content, but by stalling the manifest file at the ad block, the chances that the subscriber actually watches the ads are increased.

At some point after the expiration of the playback duration, at 322, the adaptive bit rate system may add to the manifest file references to the ad content I-frames that were omitted during the ad break. The ad content I-frame playlists facilitate trick plays on the ad content. As described above, the omission of the I-frame playlist references prevents trick plays during the ad break. Thus, once the playback duration for a respective period has expired, and references to the I-frames for the ad content associated with that respective period are added to the manifest file, trick plays on the ad content are possible. In other words, once a user presumably has watched ad content associated with a respective period indicated by the expiration of the associated ad break playback duration, the user will be able to fast forward or rewind through the ad content.

Referring back to FIG. 1, the content delivery from the just-in-time packager's origin server 110*b* to the adaptive bit rate subscribers 122, 124 may flow through the content delivery network 120, the same as the linear content. Due to the size and the number of subscribers accessing content from a headend, the content delivery network 120 may not cache on demand content, particularly nDVR and long tail VOD. However, in embodiments, on demand content may be cached at the content delivery network 120. For example, popular VOD content or VOD media files may be cached in the content delivery network 120. However, to avert ad skipping with respect to the disclosed techniques, if on demand media files are cached in the content delivery network, the manifest files for that content would not be cached in the content delivery network 120 and would still be provided per client directly by the just-in-time packager 110*a*.

It is noted that in embodiments in which the just in time packager packages content in real time based on specific client requests, less storage may be necessary than that used by the live content path. Instead, the manifest file and posting of media segments is done in response to a client request. The manifest file is generated on demand and only provides references up to an ad boundary.

As shown in FIG. 1, in embodiments the HTTP origin server 110*b* is built in to the just-in-time packager 110*a*. The all in one embodiment is intended to handle one subscriber at a time per asset. Thus, unlike a linear packager 108 and an origin server separate from the linear packager, where the origin server is accessible by numerous users for the same service or asset, the combined origin server and just in time packager server clients individually. Based on the manifest file requests, the just-in-time packager 110*a* in real time will fulfill these requests and create the requested manifest files and will post the associated media chunks to its internal origin server 110*b*.

While FIG. 1 depicts an example just-in-time packager and HTTP origin server 110*b*, a plurality of just-in-time packager packagers with built in HTTP origin servers may be employed in the adaptive bit rate system 100 to serve a plurality of users. Thus, while the just-in-time packager serves multiple users, each user accesses a different asset. For example, if the just in time packager can perform fifty (50) packaging jobs, then the just-in-time packager can support fifty (50) users. In the live broadcast case with an external server, if the just-in-time packager can package fifty (50) jobs and publish them to the origin server, the origin server can serve thousands of users, i.e., with multiple users accessing the same program. Thus, in disclosed embodiments, due to the fact that the just-in-time packager fulfills requests specifically for a client requesting the content, the origin server is combined with the just-in-time packager. The packagers and HTTP origin servers may be assigned to respective users via a load balancer.

The packager 110*a*, 126 may also support a playlist rebuild (playlist rebuilder) function for generating and/or rebuilding an adaptive streaming manifest file. In embodiments, the packager 110*a* can change how the manifest file is exposed to the subscriber via the playlist rebuilder 110*c*. The function of the playlist rebuilder 110*c* is to receive a single manifest or play list file from a packager 110*a* and manipulate the manifest by modifying parts of it, creating one or more different manifest files for the same piece of content. The rebuilt manifest files are published to one or more servers 110*b* along with the content. As described in FIG. 3, the rebuilt manifest files may be rebuilt to correspond to the adaptive bit rate media segments that are made available to the user, such as the manifest file built at 316, then updated (either revised or appended to) at 318, and again at 320 and 322.

The playlist rebuilder rebuilds playlists, e.g., the rebuilder manipulates manifests. The packager may receive ad content and perform segmentation as well. In embodiments, the packager/playlist rebuilder receives segments for ad content from the ad content storage 118 and builds the manifest file using the received ad segments. In embodiments, the packager/playlist rebuilder receives ad content and performs the segmentation of the ad content. In embodiments, the packager/playlist rebuilder does not segment the ad content but may build the manifest files with ads from the ad content storage 118. In embodiments, the packager/playlist rebuilder inserts ad content received from the ad content storage 118 in to the manifest file to be delivered with the media segments. In embodiments, the packager/playlist rebuilder replaces ad content in the asset file received from the nDVR content storage 104 or VOD content storage 106 with ad content/segments received from ad content storage 118. FIG. 4E Illustrates an example of a asset timeline with ad-insertion/replacement via manifest manipulation.

The playlist rebuild function 110*c* may be embedded within the packager 110*a*, as shown in FIG. 1, or it may be an external function depending on the implementation. To support either the internal or external playlist rebuilder 110*c*, the packager may insert additional metadata or extension fields into the manifests created during the chunking operation. The playlist rebuilder 110*c* can use the additional metadata to perform its functions and may or may not drop (based on configuration) the additional metadata before publishing the playlists/manifests to a server.

As shown in FIG. 1, with respect to VOD content, an off-line on demand packager 126 may pre-package VOD content by manipulating the manifest file in real time. For example, popular titles may be pre-packaged so they are stored closer to the subscriber in the network. The playlist rebuilder 128*b* for the HTTP origin server 128*a* for VOD content may use the already packaged VOD content to feed the subscriber 122, 124.

Playlist rebuilders 110*c*, 128*b* may be used for content substitution applications such as, but not limited to, ad-insertion, black out substitution, and EAS message propagation/substitution. The playlist rebuilder 110*c*, 128*b* may be used to perform manifest obfuscation so as to make ad-avoidance of advertisements more difficult. For example, playlist rebuilder 110*c* can receive an initial manifest file from the just-in-time packager 110*a* and use the received initial manifest file to generate a rebuilt manifest file based on the techniques disclosed. The playlist rebuilder can start with a manifest file that encompasses the entire program or on demand asset, and break it down in to pieces based on the ad breaks, such as those described with respect to FIG. 4B. The manifest file received by the playlist rebuilder 110*c*, 128*b* from the packager 110*a*, 126 may contain metadata or proprietary extensions inserted by the packager 110*a*, 126 that allows the playlist rebuilder to easily process the manifest file by helping the playlist rebuilder identify locations of ads or start and end of content that needs to be substituted.

FIG. 4C represents an example of how content from the plurality of differently encoded files shown in FIG. 4B is retrieved in each period for playback of the requested on demand asset. Adaptive bit rate streaming enables the adaptive bit rate client device to detect the device's bandwidth in real time and adjust the quality of the video stream accordingly (via requests for differently encoded adaptive bit rate media segments). As described herein, the adaptive bit rate client device is made aware of the available streams at differing bit rates and the segments for each stream via the manifest file. The manifest file directs the user to the available adaptive bit rate media segments located in each of the files, and the adaptive bit rate client device fetches a suitable adaptive bit rate media segment for playback.

The adaptive bit rate client device 404 in FIG. 4C reads the manifest file provided to the device by the adaptive bit rate system 100 and determines a suitable media segment to retrieve. In this example, the request is for an on demand asset, presumably from the start. Files 1, 2, and 3 have an ad break 1 associated with the first period A. Thus, the manifest file provided to the adaptive bit rate client device 404 by the adaptive bit rate system 100 includes references to adaptive bit rate media segments from each of the differently encoded files, but only the media segments ABRMS1, ABRMS2, and ABRMS3 from the first period occurring prior to the ad break 1.

The first adaptive bit rate media segment ABRMS1 selected for retrieval by the adaptive bit rate client device 404 is from File 1. The adaptive bit rate client device 404 sends a request 402 for the media segment via the content delivery network 405. The adaptive bit rate client device continues fetching media segments referenced in the manifest file throughout the first period, relative to period A shown in FIG. 4B, and retrieves ABRMS1 from File 1, ABRMS2 from File 2, and ABRMS3 from File 1.

Thus, FIG. 4C illustrates an example of the adaptive bit rate client device 404 switching between the differently encoded files to retrieve media segments. By enabling the adaptive bit rate client device 404 to switch between the differently encoded versions of the on demand asset, the adaptive bit rate client device 404 can fetch media segments best suitable for the adaptive bit rate client device's capabilities and/or an available bandwidth. For example, if the adaptive bit rate client device 404 determines that a download speed is greater than a bit rate of the segment downloaded, the adaptive bit rate client device 404 may request a next higher bit rate segment from a different file. Alternately, if the adaptive bit rate client device 404 identifies that a download speed for a segment is lower than a bit rate for the segment (e.g., network throughput has deteriorated), the adaptive bit rate client device 404 may request a lower bit rate stream. The segment size can vary depending on the particular implementation, but in embodiments the segments are between two and ten seconds in duration.

Each of the files, File 1, File 2, and File 3 is associated with an ad break, ad break 1. A playback duration 403 corresponds to the ad break 1. The adaptive bit rate system 100 may update the manifest file with references to ad content 118. Before the adaptive bit rate client device 404 can retrieve media segments from another period, the playback duration 403 associated with the ad break 1 must expire. Thus, until the playback duration associated with ad break 1 expires, the adaptive bit rate client device does not have access to information for additional content in on demand asset files.

Following expiration of the playback duration 403 of the ad break, the adaptive bit rate system 100 may then update the manifest file made available to the adaptive bit rate client device with references from a second period of the differently encoded files for the on demand asset. For example, following expiration of the playback duration of the ad break 1 shown in FIG. 4C, the adaptive bit rate system 100 may update the manifest file with media segments from period B, ABRMS4, ABRMS5. In this example, the adaptive bit rate client device requests continued playback and the next media segment in the on demand asset retrieved is ABRMS4 from period B, this time from File 3.

In embodiments, the first media segment fetched by the adaptive bit rate client device may be prior to the first ad break. For example, in the embodiment described with respect to FIG. 4C, the on demand asset was requested from the beginning. In another example, the subscriber request may be for a media segment that is not at the beginning, but is still prior to the first ad break, such as a request for ABRMS2. The first period in this example, therefore may be defined as including ABRMS2 and the media segments that occur following ABRMS2 until the next ad block (i.e., ABRMS3). In this example, period A would include only adaptive bit rate MS2 and adaptive bit rate MS3. Thus, in embodiments, ABRMS1 may not be included based on the assumption that the user will not need to rewind to a point prior to the request, thus saving bandwidth.

Figure 4D:
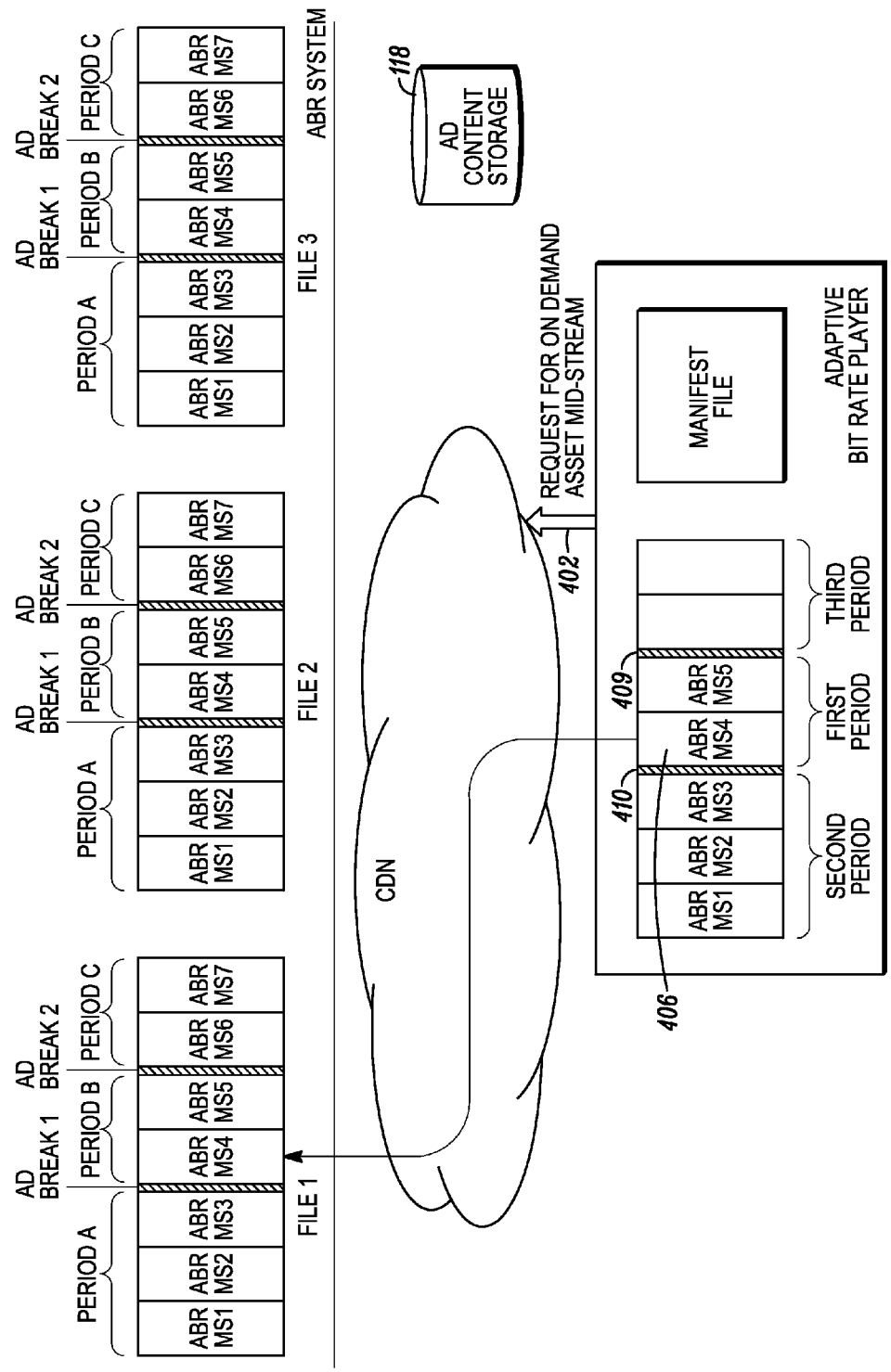
FIG. 4D represents another example of how content from the plurality of differently encoded files shown in FIG. 4B is retrieved.
Figure 4E:
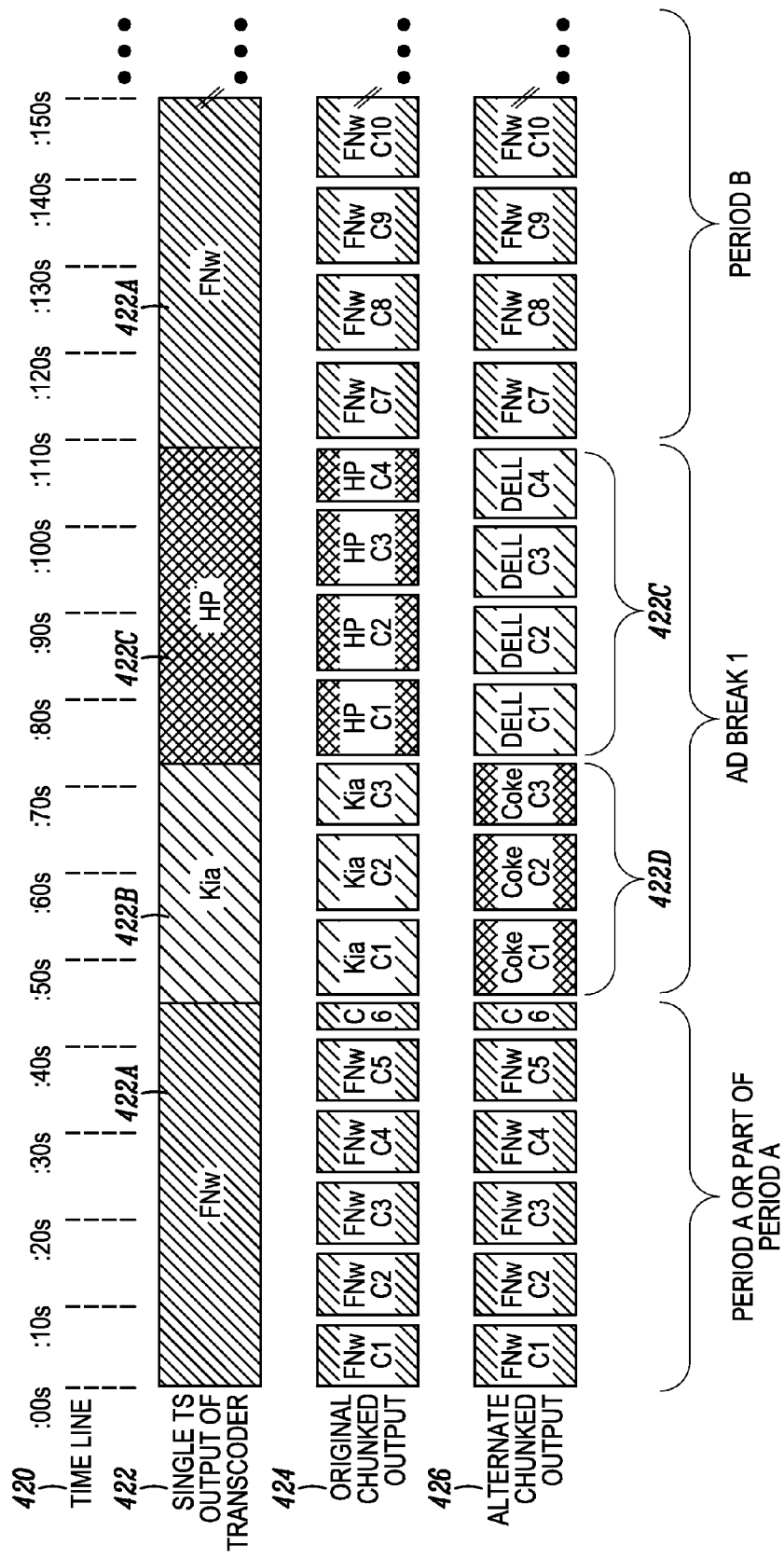
FIG. 4E illustrates an example of an asset timeline with ad-insertion by manifest manipulation.

FIG. 4D addresses example scenarios for a subscriber requesting content initially from a period other than the earliest period in the on demand asset, or the subscriber attempting to fast forward to a period other than the period that is next sequentially in the File. For example, the request from the adaptive bit rate client device 404 is a request for a chapter of content occurring in the on demand asset shown by 406, which follows the first ad break 1. To be provided with a manifest file that references content in the on demand asset that occurs after an ad break, the adaptive bit rate system 100 identifies an ad break playback duration that stalls the delivery of the manifest file with references to the requested content. FIG. 4D illustrates the determination of the ad playback duration where the media segments associated with the requested on demand asset occurs after a first ad break.

In this example, based on the segmentation of Files 1, 2, and 3, content 406 is associated with ABRMS4 in period B. In this example, period B is referred to as the first period because it is the period in which the requested adaptive bit rate media segment is located. Because the adaptive bit rate media segment ABRMS4 associated with the request for on demand asset in the first period occurs after an ad break, ad break 1, the adaptive bit rate system will wait to provide a manifest file with references to media segments for the first period, period B, until an ad break playback duration 410 associated with ad break 1 expires.

Thus, where content is requested at a point in the segmented files after at least one ad break, in embodiments, the playback duration of the ad break is determined based on the ad breaks associated with the periods that occurred in the on demand asset at a time prior to the first period. In this example, only one period, referred to for purposes of distinction as the second period, is shown occurring prior to the first period, and a single ad break, ad break 1, is shown associated with the second period. Thus, the adaptive bit rate system 100 will provide a manifest file with references to media segments for the first period, period B, after an ad break playback duration 410 has expired.

Following expiration of the ad break duration, the adaptive bit rate system may also update the manifest file with references to media content from the first period and the ad content associated with break 1. For example, in FIG. 4D, following expiration of the ad break playback duration represented by 410, the manifest file may be updated with media segments from the first period, ABRMS4, ABRMS5, and the second period, ABRMS1, ABRMS2, and ABRMS3, as well as references to ad content associated with the ad break 1. In embodiments, only the media segments that include and follow the requested start time of the on demand asset within a period are provided.

For purposes of example, assume that following a retrieval of segment ABRMS4 associated with the on demand user request, the user performs a trick play (e.g., fast-forward, rewind) that indicates a request for content from the second period as shown in FIG. 4D. For example, the user may attempt to rewind to a segment in the second period that occurs prior to the initially requested media segment, ABRMS4. Because the ad break playback duration associated with period 1 has already expired, the adaptive bit rate client device may access via the manifest file to references to the media segments in the second period. Thus, the adaptive bit rate client device may use the manifest file to fetch these segments associated with the expired ad break playback duration without having to wait an additional ad break playback duration. Further, references to I-frame playlists associated with ad content played during the ad break playback duration 410 may be included in the manifest file, thus allowing the user to perform trick plays on the ad content as well.

In embodiments, if the adaptive bit rate client device has already waited out the previous ad break playback duration up to a point in a previous viewing, the requirement for the ad break playback duration up to that point to expire may be deemed satisfied for future viewings Future or unexpired ad break playback durations may still be relevant, however. In embodiments, the manifest file may be kept current only for a session or it may expire after a certain time period. For example, the manifest file described in FIG. 4D after the ad break playback duration 410 has expired is updated to include references to media segments from the first and second periods and ad content associated with the ad break playback duration 410. However, if the current session is stopped or completed, the manifest file may not be saved. Thus, if a user tries to go back at a later time, e.g., week later, and start the on demand asset from the middle, the user will have to watch the ads from the beginning again. In embodiments, the manifest file will remain updated for a period of time, such as 24 hours or a week. In embodiments, the manifest file remains updated indefinitely. Bookmarking may allow an nDVR to register how much of an on demand asset has been played back and the ad break playback durations that have been endured such that they do not have to be reviewed again on a subsequent viewing.

Similar to the above description of FIG. 4C, if the user attempts to fast forward to the third period shown in FIG. 4D or has finished retrieval of content in the first period and requests continuous play of the on demand asset, an additional ad break playback duration 409 must expire before the adaptive bit rate system updates the manifest file with media segments from the third period.

FIG. 4E illustrates an example of an asset timeline with ad-insertion by manifest manipulation. In this example, the timeline 420 is depicted in seconds. A typical input to the just in time packager is shown at 422 as a single transport stream output of a transcoder. FNw 422a is the content, Kia 422b and HP 422c are ads captured and stored with the original content FNw. Referring to FIG. 4A, for example, FNw corresponds to content found within a plurality of periods along the asset timeline, and ads 422b and 422c are included in an ad break. Resulting from segmentation by the just in time packager of the input 422 is the original chunked output 424. As shown in FIG. 4E, both media content in periods A and B and ad content in the ad break 1 is segmented in to a plurality of segments, or chunks.

The alternate chunked output 426 represents a stream alternate to the original chunked output stream 424 when ads from the ad content storage 118 are inserted in to the stream (or are used to replace ads within the original stream 424). To generate the alternate chunked output 426, the main asset content is received from the packager at the playlist rebuilder. Alternate ads are received from the ad content storage system 118. The packager creates the complete manifest file, including manifest references to the alternate ad content. An ad insert system with access to ad content storage 118 may provide the packager with the manifest references to the alternate advertisements. For example, the Kia 422b and HP 422c ads may be replaced with Coke 422d and Dell 422e advertisements. As disclosed herein, the manifest provided to the subscriber will be limited based on the periods of content watched by the user along the asset timeline. FIG. 4E depicts a manner for different ads to be updated in the manifest file at the appropriate time according to the disclosed techniques.

Figure 5:
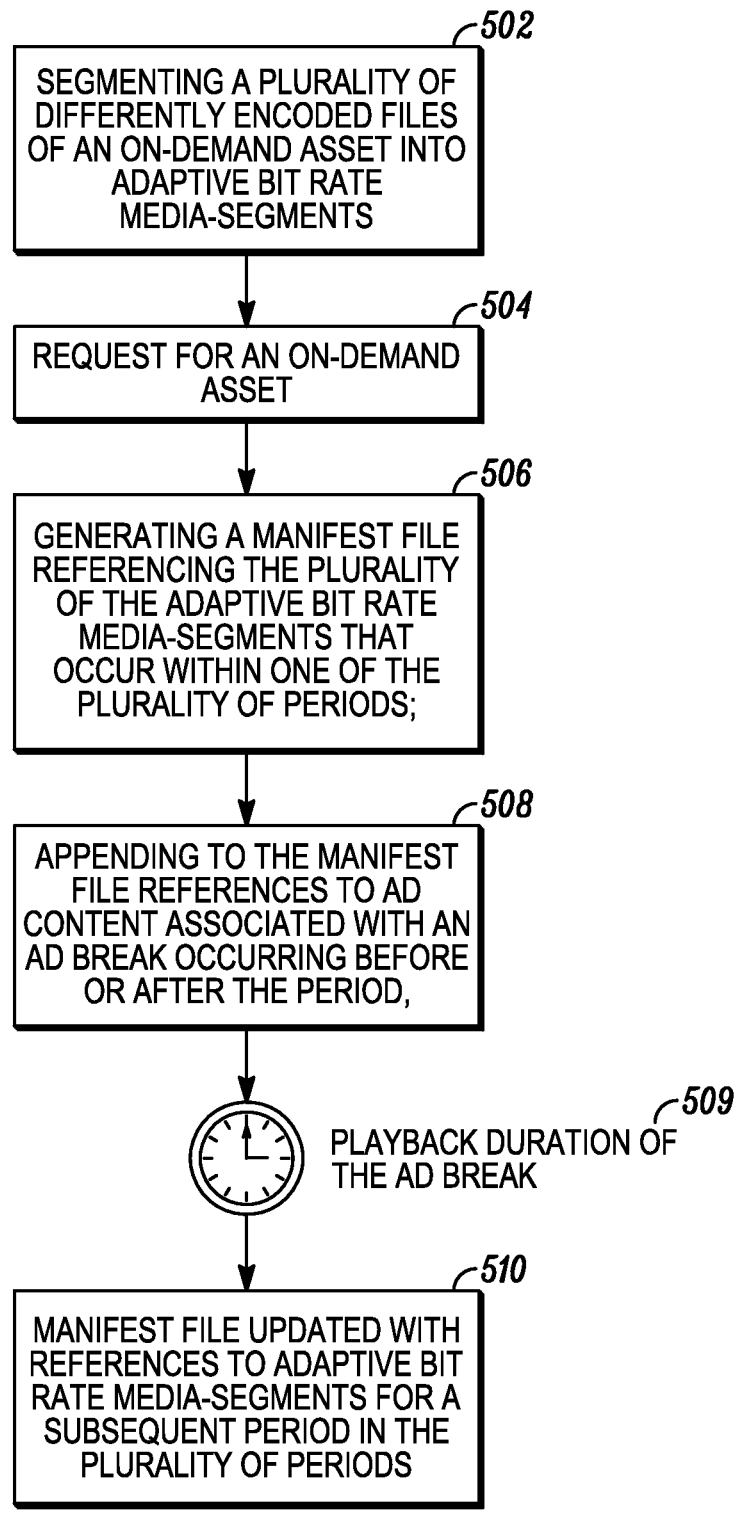
FIG. 5 depicts another example flow diagram for preventing or minimizing ad skipping at an adaptive bit rate client device.

FIG. 5 depicts an example flow diagram for another embodiment of the disclosed techniques. In this embodiment, at 502, the adaptive bit rate system segments a plurality of differently encoded files of an on demand asset into adaptive bit rate media segments, wherein each of the differently encoded files comprises a plurality of periods separated by ad break locations, each period including a plurality of the adaptive bit rate media segments.

At 504, an adaptive bit rate client device requests an on demand asset and the packager receives a request to package the on demand asset for the adaptive bit rate client device. At 506, the packager generates a manifest file referencing the plurality of the adaptive bit rate media segments that occur within one of the plurality of periods. At 508, the packager appends to the manifest file references to ad content associated with an ad break occurring before or after the period. After the playback duration of an ad break has expired at 509, at 510 the packager updates the manifest file with references to adaptive bit rate media segments for a subsequent period in the plurality of periods.

Figure 6:
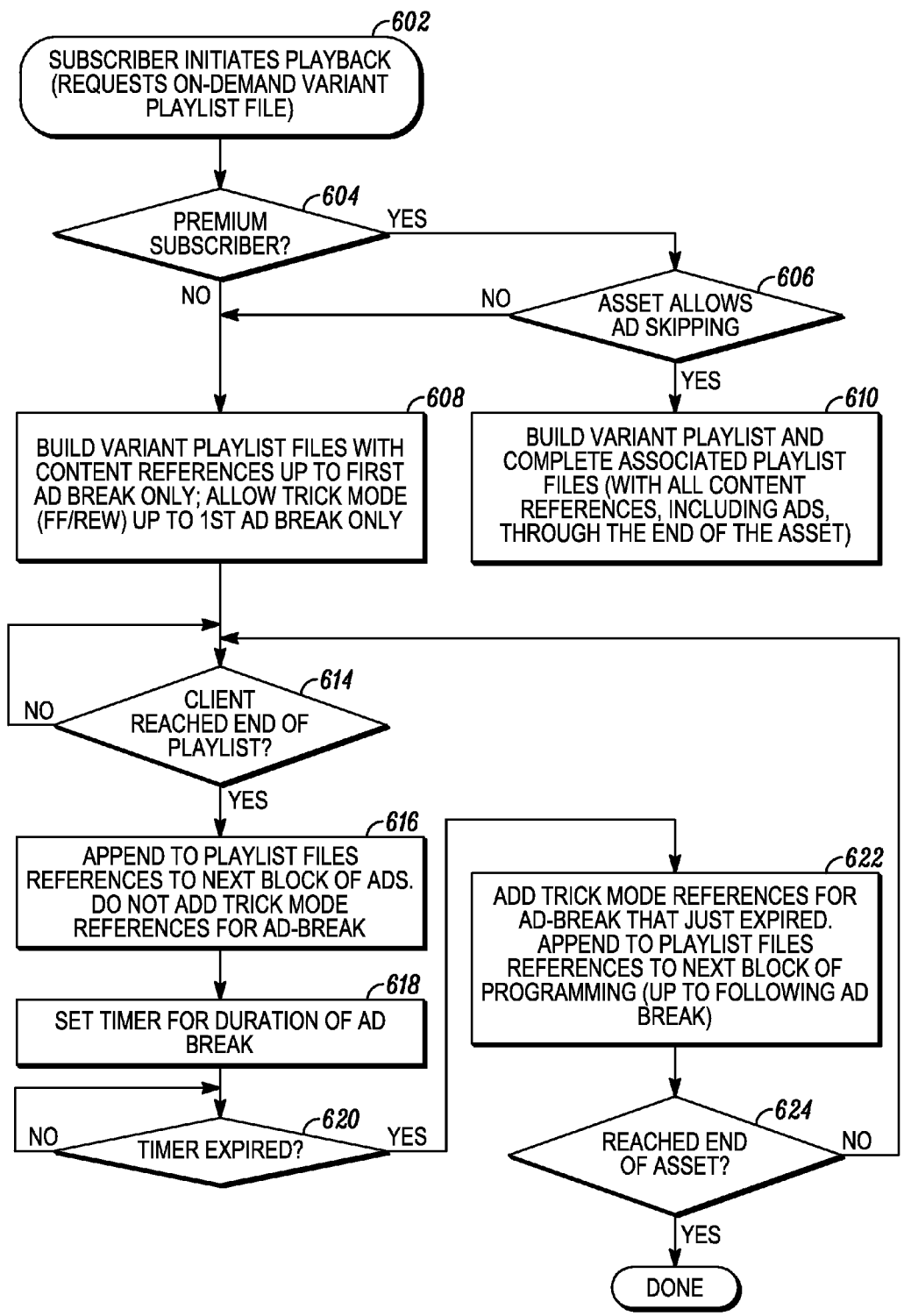
FIG. 6 depicts another example flow diagram for preventing or minimizing ad skipping at an adaptive bit rate client device.

FIG. 6 illustrates another example flow diagram implementing the disclosed techniques for preventing or inhibiting ad skipping in an adaptive bit rate environment. In embodiments, ad skipping is allowed for a premium subscriber if the asset is also approved for ad skipping.

At 602, a subscriber initiates playback at an adaptive bit rate client device, thereby requesting an on demand variant playlist. The adaptive bit rate system 100 determines at 604 whether the subscriber is a premium subscriber or not. In this example, only a premium subscriber is given access to perform ad skipping on content approved for ad skipping. Thus, if the subscriber is a premium subscriber, and the asset is approved for ad skipping at 606, the variant playlist and associated playlist files (including all content references, including ads, through the end of the asset) are provided to the subscriber at 610.

If, at 604, the adaptive bit rate system determines that the subscriber is not a premium subscriber, at 608 the adaptive bit rate system generates a variant playlist and associated playlist files with content references up to only a first ad break. The variant/manifest file or playlist describes the multiple bit rate versions of the media presentation that are available and the location of each one of them. The client device is able to use the manifest file to request fragments via HTTP from the content delivery network. Thus, due to the limitations on the content in the manifest file, trick play options (e.g., fast forward, rewind) are only available on the content up to the first ad break. For example, for a 2 hour on demand asset, the manifest file may only include references to content included in the first fifteen minutes of the on demand asset. The subscriber may freely fast forward or rewind throughout that fifteen minutes of content.

From 614-624, the adaptive bit rate system cycles through a series of steps to progressively provide content to a subscriber. At 614, the adaptive bit rate system determines if the client has reached the end of the manifest file provided at 608, which only included content up to the first ad break. For as long as the subscriber is watching the chunks up to the first ad break, the just in time packager knows that client is requesting more of the manifest file.

If the client does reach the end of the manifest file (e.g., the subscriber makes a request for more content beyond the first ad break), at 616 the adaptive bit rate system appends manifest file references for an ad block (the first ad block if this is the first time through this process, or a next ad block following a next period of content). Trick mode references for the ad break are not included, thereby preventing trick play on the ad content displayed during the ad break. Thus, for example, the user may be provided three minutes of ads and is forced to wait out the duration of the ad break before the manifest file has additional content for the adaptive bit rate client to request. As described above, a lack of I-frame playlist support for ad segments inhibits the trick play options during the ad break (HLS, along with manifest file is an I-frame manifest file which allows them to do fast forwarding).

At 618, a timer associated with a playback duration of the ad break is set. For example, a network may set a time for a three minute duration of a break. Once the adaptive bit rate client device determines that the time has expired at 620, the presumption is that the ad content during the ad break has been viewed. When the timer expires, trick mode references for the ad break that expired are added to the manifest file. Thus, at this point, the subscriber can perform trick plays on the first fifteen minutes of content and also on the ad content.

Also when the timer expires, the adaptive bit rate system appends to the manifest files references to a next block of programming, but only up to a next ad break. The steps between 614-622 continue until, at 624, the adaptive bit rate system determines that the client has reached the end of the asset. Once the client reaches the end of the asset, the method in FIG. 6 is complete.

The manifest file and corresponding adaptive bit rate media segments posted to an origin server may be available to the subscriber for a limited period of time. For example, the duration that the manifest file and media segments are available may be based on a subscriber level. Premium subscribers may be given longer access. Once the manifest file and corresponding media segments are cleared, the subscriber may have to start the process shown in FIG. 6 back at 602.

In the various embodiments described herein, the adaptive bit rate system operator may want to provide distinct capabilities to adaptive bit rate clients based on levels of subscription. For example, an operator may want to allow premium subscribers, via some sort of upgrade charge, to be given the ability to fast forward through commercials. In other words, the ad skipping may or may not be allowed on per subscriber basis. Further, the ad skipping may or may not be enabled on a per asset basis. Thus, whether or not ad skipping is allowed may be a function of both asset and individual subscriber's entitlements.

The subscriber management system 114 shown in FIG. 1 is an example for managing a subscription level of a subscriber. The packager may also utilize the subscriber management system to support encryption of content for each adaptive bit rate streaming method in compliance with their published guidelines. Encryption information will also be appended to the respective manifest files as appropriate. The packager will be capable of generating keys internally or will interface with external key servers to obtain encryption keys. The packager will support Secure Media DRM, Play Ready DRM, and Flash Access. Based on future customer needs the packager will be able to integrate with other third-party DRM systems. There will be requirements to support multiple DRM systems for the same piece of content.

Despite the disclosed techniques, the client may be able to defeat these ad skip prevention techniques provided the client stores locally large sections of the asset prior to playback. However, doing this would be inconvenient for the user and require significant local storage; most subscribers won't go to this trouble, to preload and store the entire asset before playback, just to defeat ad skip blocking.

Compared to traditional video providers (e.g. via HFC) the tight control of the adaptive bit rate client application is not expected to be the norm. Thus, clients will remain varied and 'open', largely outside the control of the network operator, and thus cannot be relied upon to enforce ad skip prevention rules. Using the disclosed techniques enables enforcement of ad skip prevention from within the domain of network components under network operator control, such as in the component referred to herein as the packager. Also, with adaptive bit rate, the client is usually free to pull media chucks from HTTP servers, so the control point of a streaming server does not exist in the same way for adaptive bit rate as it does in traditional video delivery networks. Thus, unlike existing technologies, the disclosed techniques are able to inhibit or avert ad skipping within the context of open and flexible adaptive bit rate implementations.

Further, compared to the solutions related to the delivery of content over the web, the web-base systems often rely on dedicated clients (with integrated ad skip prevention). Or they do not support the flexibility and robustness of adaptive bit rate delivery (the ability for the client to seamlessly switch between quality level streams). Or those solutions do not support the notion of premium and standard subscriber levels.

FIG. 7 illustrates components for implementing adaptive bit rate streaming that can be used with the disclosed techniques for preventing ad skipping. A packager 700 includes an encoder 706 or 708, a fragmenter 722, and a web server 730 (e.g., HTTP streaming server). The packager 700 outputs a manifest file 732 for adaptive bit rate metadata. The adaptive bit rate system delivers the manifest file and corresponding content using adaptive bit rate techniques to an adaptive bit rate client device 734.

Adaptive bit-rate streaming is a technique for streaming multimedia where the source content is encoded at multiple bit rates. Adaptive streaming, also known as adaptive bit rate (adaptive bit rate) streaming, is a delivery method for streaming video over Internet Protocol (IP). It is based on a series of short Hypertext Transfer Protocol (HTTP) downloads which is applicable to the delivery of both live and on demand content. It relies on HTTP as the transport protocol and performs the media download as a series of very small files. The content is cut into many small segments (chunks) and encoded into the desired formats. A chunk is a small file containing a short video segment (typically 2 to 10 seconds) along with associated audio and other data. Adaptive streaming uses HTTP as the transport for these video chunks.

Adaptive bit rate techniques enable the content delivery system to detect a user's bandwidth and optionally other capabilities, such as CPU capacity, in real time and adjust the quality of a video stream accordingly. It uses an encoder which can encode a single source video at multiple bit rates. The client switches between streaming the different encodings depending on available resources. The result: very little buffering, fast start time and a good experience for both high-end and low-end connections.

Many solutions for preventing ad skipping require a trusted client device (i.e., a client device that is nominally under control of the network operator or content provider) that can prevent ad skipping after the content has been delivered to the client device. For example, a trusted client device can employ software when playing back content recorded at the client device that prevents third party software from interrupting the display of ads in the content. Governing the ad content in the client itself, such as by putting tags in the content and having the client device force behavior, is not always available. For example, you can see in the playbar where the ads will appear, and the client device will control access to the ads from the client device control.

In the adaptive bit rate environment, however, network operators often have less control over the client, since clients are deployed across a wide variety of consumer devices (e.g., iPad, iPhone, Android tablets, Kindle Fire, etc.). Further, adaptive bit rate systems are open to increased risk because of how client devices access media files from the network. In particular, the nature of adaptive bit rate, with clients pulling chunks of media files/segments as needed, allows for much more 'free form' access to media that would tend to allow for freedom for the client to skip ads. Solutions developed for existing distribution networks for preventing ad skipping have deficiencies when deployed in adaptive bit rate environments.

Disclosed herein are network based techniques for preventing the skipping of ads, suitable also for adaptive bit rate environments. In embodiments, the methods are managed by the network on the network delivery side of the adaptive bit rate system and is device agnostic. Thus, in embodiments, the techniques disclosed do not require a cooperative client (in other words, the client may have control to attempt to skip the ads, but attempts to skip ads may be thwarted by the network per the implementation of the disclosed techniques). The techniques disclosed may prevent a user from skipping advertisements when using adaptive bit rate by changing the way manifest files are created (client specific) and exposed to the client (based on ad breaks).

The client device may request fragments of video from the server for playback at the client device. Since adaptive bit rate fragments are available on the server in one of several bit rates, the client may switch bit rates at the fragment boundaries. Thus, the client can adjust its request for the next fragment. The result is a system that can dynamically adjust to varying network congestion levels. Often, the quality of the video stream streamed to a client device is adjusted in real time based on the bandwidth and CPU of the client device. For example, the client may measure the available bandwidth and request a fragment that best matches a measured available bit rate.

As shown in FIG. 7, the live stream 702 and stored stream 704 may be input to a real-time encoder or an on demand just-in-time encoder, 706, 708, respectively. The encoder converts whole content streams in to multiple streams at different bit rates. For example, an encoder is responsible for taking an MPEG stream (e.g., MPEG-2/MPEG-4) or a stored MPEG stream (e.g., MPEG-2/MPEG-4), encoding it digitally, encapsulating it in to MPEG-2 single program transport streams (SPTS) multiple bit rates formats, and preparing the encapsulated media for distribution. The live stream 702 may be encoded into three transport streams, 710, 712, 714, each having a different bit rate. The live stream 702 may be a broadcast of multimedia content from a content provider. The stored stream 704 is transcoded in to three transport streams, 716, 718, and 720, each having a different bit rate. The stored stream may be on demand content, for example.

The resultant transport streams 710, 712, 714, 716, 718, and 720 are passed through a fragmenter 722. The fragmenter 722 reads each encoded stream 710, 712, 714, 716, 718, and 720 and divides them in to a series of fragments of a finite duration. For example, MPEG streams may be divided into a series of 2-3 second fragments with multiple wrappers for the various adaptive streaming formats (e.g., Microsoft Smooth Streaming, APPLE HLS).

As shown in FIG. 7, the transport streams 710, 712, 714, are fragmented by fragmenter 722 into adaptive bit rate media segments 724*a-e*, 726*a-e*, and 728*a-e*, respectively. The resultant transport streams 716, 718, and 720, are fragmented by fragmenter 722 into adaptive bit rate media segments 730*a-e*, 732*a-e*, and 734*a-e*, respectively. The fragmenter 722 is also referred to herein as a packager, as the packager can include fragmenting the content into fragments and then encrypting each fragment using a content key.

The packager 700 can generate a manifest file that represents a playlist. The playlist can be a manifest file that lists the locations of the fragments of the multimedia content. By way of a non-limiting example, the manifest file can comprise a uniform resource locator (URL) for each fragment of the multimedia content. If encrypted, the manifest file can also comprise the content key used to encrypt the fragments of the multimedia content The packager may facilitate adaptive bit rate streaming of video and audio to multi-screen video (MSV) clients. The packager may be a software element residing on a multirate transcoder. The packager may co-exist with a HTTP server, a streaming Edge Server, or may be a standalone appliance. Further the packager may optionally have a built-in content delivery network interface or an HTTP server interface such that it can support clients directly. Direct support of clients may be limited to VoD and nDVR type applications.

The discrete segments may be delivered using common Internet protocols, namely HTTP over TCP/IP, a robust and reliable transfer protocol in which clients request content segments and web servers respond accordingly. Thus, within an embodiment of an adaptive bit rate system, knowledge of all content segments delivered and to whom they are delivered can be provided for use in network-based viewership monitoring.

As described herein, the types of content that the packager may package includes Live Linear, VOD, StartOver, and nDVR. VOD content and nDVR content were described above. Live content are television programs that are watched in real time. This means that packaging must be an ongoing process that occurs simultaneously with playback. StartOver contents are live content whose viewing can be started after the content start time. You can for example at 7:15 PM start watching a 7:00 PM live program.

Per service the packager will be configured to perform segmentation/chunking for either all output adaptive bit rate formats or a subset of the output adaptive bit rate streaming formats. The packager will also create the respective manifest files. The chunk durations may be different for each adaptive bit rate format, but they will all have to be an integer multiple of the GOP size or key frame intervals. However for a given adaptive bit rate format the chunk durations will be the same for all streams in an output stream group.

The packager may be a logical software service which can run on various hardware platforms, located at various points in the network. In general it either lives "in the center" or "at the edge". In a center deployment it may be logically positioned between the Transcoder and the origin server. In an edge deployment it is logically positioned between the origin server and the Edge Server.

The packager shall further support ad-insertion, blackout/content substitution, and EAS via playlist manipulation. The actual playlist manipulation may or may not be performed by the packager.

In centralized packaging the transcoder and packager may be co-located. The transcoder may directly feeds multibitrate streams into the packager. The packager performs its packaging function and publishes the adaptive bit rate streams to one or more servers downstream from it. In both instances of remote packaging the packager is separated from the transcoder by some type of an IP network. In the distributed packaging instance the transcoder and packager may be separated by a multicast routable IP network. In such a network the transcoder outputs multicast SPTSs that are routed directly to one or more distributed packagers. The packagers ingest these multicast transport streams perform the packaging function and publish adaptive bit rate streams to servers downstream from them. In the final case of edge packaging the transcoder and packager are separated by a content delivery network. The transcoder publishes content to the origin server of a content delivery network between the transcoder and packager. The packager uses HTTP methods to retrieve this transcoded content from the origin server. After packaging the adaptive bit rate streams are published to downstream servers for being streamed to clients upon request. Downstream from the packagers and the servers to which they publish adaptive bit rate streams, clients are typically served by MSO's DOCSIS based access networks or Telco's DSL or PON based access networks. The packager will be capable of supporting live linear content, Video on Demand (VoD), and network Digital Video Recorder (nDVR) content.

After fragmentation, the fragments and manifest files (list of assets fragment) are placed on a content delivery network server. The content delivery network logic stores the fragments according to an internal heuristic logic algorithm, determining whether and where to store the content. For example, more popular content may be stored in local storage to decrease network bandwidth usage and increase access speed. Less popular content may be stored in a central repository to reduce costs for fast storage. For example, content that may be stored includes on demand and network DVR content. Live non-DVR content fragments may be distributed by the content delivery network but not stored.

HTTP is a manner for retrieving files from the Internet and the technology is built into web browsers. HTTP has more recently become a preferred method to deliver video. It can be used to deliver video in an adaptive streaming manner in which the video is encoded into various bit rates and fragmented for delivery. Business rules, such as network congestion or processor utilization, are used to determine which bit rate is delivered at what time.

The disclosed packager supports adaptive bit rate streaming in any container formats. Examples of these adaptive bit rate video container formats include HTTP Live Streaming (Apple—HLS), Internet Information Services—Smooth Streaming (Microsoft—HSS), and HTTP Dynamic Streaming (Adobe—HDS). The container formats have become de-facto industry standards due to their widespread use. The disclosed packager also supports profiles from the MPEG-DASH (Dynamic Adaptive Streaming over HTTP) format, which is a standardized adaptive streaming specification that has been developed as an industry standard by MPEG. This system could be implemented in MPEG DASH without any special logic in the client and most likely in existing proprietary adaptive bit rate schemes. This is a novel use of dynamic manifests to control client behavior, in particular to minimize ad skipping.

An illustrative adaptive streaming system 100 may implement, for example, one or more open or proprietary protocols for adaptive bit rate streaming such as HTTP Live Streaming (HLS), SecureMedia's Encryptonite One HLS+ solution, Microsoft Smooth Streaming, HTTP Dynamic Streaming, Dynamic Adaptive Streaming over HTTP (DASH), HTTP Smooth Streaming (HSS), and the like. The packager converts one or more multi-bit rate streams of an input stream group into logical files formatted for a particular output streaming format such as HLS, HDS, HSS or DASH. In HSS, HDS and DASH all of the chunks associated with a given format and bit rate are stored within the same file. In HLS however, each chunk is stored in its own file. So assuming two second chunks, three bitrates and 30 minute program the packager will create three HSS files but 2700 HLS files. The packager can create multiple formats simultaneously. Each format to be generated is specified by a profile.

Apple HLS breaks the whole content stream in to a sequence of small HTTP based file downloads. As the stream is played, the client selects from a number of different bit rate streams based on the client CPU and bandwidth.

Microsoft HSS is a media services extension to enable adaptive streaming of media to clients over HTTP, using a concept of delivering small content fragments (e.g., 2 seconds video) and verifying that each has arrived within appropriate time and playback at the expected quality level.

Overall quality with adaptive bit rate may be the best possible for a given user's network connection, thereby maximizing the quality of experience.

To conserve network bandwidth, video file fragments can be multicast. With multicast, a single source sends data to multiple destinations at one time. Each TV channel has its own multicast. A multicast will only be joined when requested from a subscriber. Multicast makes the routers replicate fragments only when necessary (see FIG. 7). If the multicast is not already joined in a service group, then the first join from any subscriber in that service group starts it, similar to how SDV works. IP VOD delivery, though, is unicast but can the leverage the multiple bit-rate encodings to provide adaptive streaming. With this approach, the bit rate can change dynamically providing a method to manage network bandwidth. This removes the need for more formal Quality of Service (QoS) and session management solutions. Priority can be given to transactional requests to offer the highest quality video. This is a much simpler method of QoS and session management than conventional methods such as PCMM In one or more examples, the functions described herein may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In an embodiment, a computer-readable storage medium has stored thereon instructions that, when executed, cause a processor to responsive to a request for an on demand asset, identify a first period in at least one of a plurality of differently encoded files of the on demand asset in which an adaptive bit rate media segment associated with the request for the on demand asset is located, identify an ad break that is associated with the first period, generate a manifest file referencing adaptive bit rate media segments that occur within the first period of the at least one of the plurality of files of the on demand asset for use by an adaptive bit rate client device for retrieval of the referenced media segments, following retrieval of desired adaptive bit rate media segments by the adaptive bit rate client device during the first period, append to the manifest file references to ad content associated with the ad break that is associated with the first period, wait for a playback duration of the ad break to expire before appending to the manifest file references to adaptive bit rate media segments that occur within a second period of the at least one of the plurality of files of the on demand asset.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

In an embodiment, a device for streaming adaptive bit rate streaming content through a network to a client, the device comprising one or more processors configured to responsive to a request for an on demand asset, identify a first period in at least one of a plurality of differently encoded files of the on demand asset in which an adaptive bit rate media segment associated with the request for the on demand asset is located, identify an ad break that is associated with the first period, generate a manifest file referencing adaptive bit rate media segments that occur within the first period of the at least one of the plurality of files of the on demand asset for use by an adaptive bit rate client device for retrieval of the referenced media segments, following retrieval of desired adaptive bit rate media segments by the adaptive bit rate client device during the first period, append to the manifest file references to ad content associated with the ad break that is associated with the first period, wait for a playback duration of the ad break to expire before appending to the manifest file references to adaptive bit rate media segments that occur within a second period of the at least one of the plurality of files of the on demand asset.

We claim:

1. A device for limiting adaptive bit rate content streamed through a network to a client for impeding ad skipping by the client, the device comprising one or more processors configured to:
    responsive to a request for an on demand asset, identify a first period in at least one of a plurality of differently encoded files of the on demand asset in which an adaptive bit rate media segment associated with the request for the on demand asset is located,
    identify an ad break associated with the first period;
    generate a manifest file referencing adaptive bit rate media segments that occur within the first period of the at least one of the plurality of differently encoded files of the on demand asset for use by an adaptive bit rate client device for retrieval of the referenced media segments,
    following an indication of retrieval of desired adaptive bit rate media segments by the adaptive bit rate client device during the first period, append to the manifest file references to ad content associated with the ad break that is associated with the first period;
    impeding ad skipping by waiting for a playback duration of the ad break to expire before appending to the manifest file references to adaptive bit rate media segments that occur within a second period of the at least one of the plurality of differently encoded files of the on demand asset.

2. The device of claim 1, wherein each of the plurality of differently encoded files of the on demand asset encoded at different rates are segmented into a plurality of adaptive bit rate media segments, wherein the on demand asset comprises a plurality of content periods separated by ad break periods, each period including a plurality of the adaptive bit rate media segments.

3. The device of claim 1, wherein the appendage to the manifest file with references to ad content associated with the ad break omits identification of I-frame playlists for the ad content, thereby impeding trick plays on the ad content during the playback duration.

4. The device of claim 1, wherein after the ad playback duration expires, adding to the manifest file references to I-frames of ad content in the ad break associated with the expired playback duration for facilitating trick plays on the already played back ad content.

5. The device of claim 1, wherein the manifest file is used by the adaptive bit rate client device to identify different representations of the requested on demand asset.

6. The device of claim 1, wherein a period is at least one of:
the period between a start point of the on demand asset and a start of a first ad block,
the period between two ad blocks within the on demand asset,
the period between an end of the on demand asset and a last ad block,
the period between a location of the adaptive bit rate media segment in the on demand and a location of a next ad block, or
the period between the location of the adaptive bit rate media segment in the on demand and a location of a previous ad block.

7. The device of claim 1, further comprising posting the adaptive bit rate media segments that correspond to a current version of the manifest file to an origin server.

8. The device of claim 1, further comprising including references in the manifest file to ad content associated with at least one period that occurs in the on demand asset at a time prior to the first period, wherein the playback duration of the ad break is determined based on both the ad content associated with the first period and the ad content associated with the at least one period that occurred in the on demand asset at the time prior to the first period.

9. The device of claim 1, wherein the indication that the adaptive bit rate client device has received the desired adaptive bit rate media segments during the first period comprises at least one of:
an indicator that the adaptive bit rate client device has played back all retrieved media segments in the first period,
an indicator that the adaptive bit rate client device has fast-forwarded to an end of available media segments in the first period referenced in the manifest file,
an indicator that the adaptive bit rate client device has initiated a fast-forward function or a rewind function to retrieve content from the second period where the second period occurs either after the first period or prior to the first period,
receiving a request for an updated manifest file, or
receiving a request for media segments from the second period in at least one of the plurality of differently encoded files of the on demand asset.

10. The method of claim 9, wherein the indicator that the adaptive bit rate client device has played back all retrieved media segments in the first period is based on monitoring by the just in time packager, wherein the just in time packager determines that the last media segment in the first period has been requested.

11. The device of claim 1, wherein the adaptive bit rate media segments referenced by the manifest file that occur within the first period comprise at least one of:
all of the adaptive bit rate media segments available in the first period, or
the identified adaptive bit rate media segment and the adaptive bit rate media segments that occur in the first period at a time later than the adaptive bit rate media segment.

12. The device of claim 1, wherein the ad content is stored pre-packaged in a location separate from the on demand asset.

13. The device of claim 1, wherein the manifest file is generated on a client-by-client basis and is generated and provided only to the requesting adaptive bit rate client device.

14. The device of claim 1, wherein each of the plurality of differently encoded files includes a plurality of periods, each period representing a block of content of a finite duration within the on demand asset, each of the plurality of periods having a plurality of adaptive bit rate media segments and associated with a respective ad break.

15. The device of claim 1, wherein generating the manifest file and appending to the manifest file are fulfilled in real time in response to a specific client request for the on demand asset, whereby generating the manifest file or posting associated media segments to an origin server are done only after the request is received.

16. The device of claim 1, wherein at least the first or second period ends at a start of an ad break associated with a period.

17. The device of claim 1, wherein a period is at least one of:
the period between a first adaptive bit rate media segment of the on demand asset and a first ad break,
the period between two ad breaks within the on demand asset, or
the period between an end of the on demand asset and a last ad break in the on demand asset.

18. The device of claim 1, wherein the adaptive bit rate media segment associated with the request is in multiple files in the plurality of differently encoded files, and the manifest file references media segments from the first period in each of the multiple files for a selection between file formats by the adaptive bit rate client device.

19. The device of claim 1, wherein the adaptive bit rate client device selects between a multiple of the plurality of differently encoded files based on at least one of a bandwidth or a best rate.

* * * * *